(12) United States Patent
Kim et al.

(10) Patent No.: US 10,558,368 B2
(45) Date of Patent: Feb. 11, 2020

(54) MEMORY SYSTEM AND OPERATING METHOD OF THE MEMORY SYSTEM

(71) Applicant: SK hynix Inc., Gyeonggi-do (KR)

(72) Inventors: Dae-Hong Kim, Gyeonggi-do (KR); Soong-Sun Shin, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 569 days.

(21) Appl. No.: 15/179,485

(22) Filed: Jun. 10, 2016

(65) Prior Publication Data
US 2017/0185319 A1    Jun. 29, 2017

(30) Foreign Application Priority Data
Dec. 29, 2015    (KR) .................. 10-2015-0188677

(51) Int. Cl.
*G06F 3/06* (2006.01)
(52) U.S. Cl.
CPC .......... *G06F 3/0613* (2013.01); *G06F 3/0659* (2013.01); *G06F 3/0685* (2013.01)
(58) Field of Classification Search
CPC . G11C 7/1042; G06F 3/0659; G06F 12/0607; G06F 11/10; G06F 3/0688; G06F 12/126; H04L 1/0071; G11B 20/1866
See application file for complete search history.

(56) References Cited

U.S. PATENT DOCUMENTS

| | | | |
|---|---|---|---|
| 7,793,059 B2* | 9/2010 | Cornwell | G06F 12/0607 711/157 |
| 8,341,332 B2 | 12/2012 | Ma et al. | |
| 2011/0307758 A1* | 12/2011 | Fillingim | G06F 11/1048 714/758 |
| 2013/0227229 A1* | 8/2013 | Ishikawa | G06F 12/00 711/154 |
| 2014/0281280 A1* | 9/2014 | Goss | G06F 3/067 711/148 |

FOREIGN PATENT DOCUMENTS

| | | |
|---|---|---|
| KR | 1020140040137 | 4/2014 |
| TW | 201314698 | 4/2013 |

OTHER PUBLICATIONS

Method for Improving Read Latency Performance Using CCP (Continuous Command Prediction) and Zigzag Stripping.
(Continued)

*Primary Examiner* — Yong J Choe
(74) *Attorney, Agent, or Firm* — IP & T Group LLP

(57) ABSTRACT

This technology relates to a memory system in which a plurality of memory devices operates in an interleaving manner and an operating method of the memory system. The memory system may include a plurality of memory devices, a host controller suitable for generating a plurality of internal read commands by splitting an external read command applied from a host in a minimum read size, and a memory controller suitable for checking information about internal read commands which belong to the plurality of internal read commands and which are sequentially late in a section in which a read operation is performed on the plurality of memory devices based on check values of information about internal read commands which belong to the plurality of internal read commands and which are sequentially ahead.

15 Claims, 13 Drawing Sheets

(56) References Cited

OTHER PUBLICATIONS

Kim, E. et al., Let's hear it for the latest in PCIe SSDs—A Panel, In Proceeding of Flash Memory Summit, 2014, Santa Clara, CA.
Samsung Inc. Samsung SSD 850 PRO , Data Sheet, Rev.2.0, Jan. 2015.
Intel Inc. Intel® Solid-State Drive Data Center Family for SATA (S3710, S3610, S3510 Series) Product Brief.
Agrawal, N. et al., Design Tradeoffs for SSD Performance, to appear in the Proceedings of the USENIX Technical Conference, Jun. 2008.
Jung, M. et al., An Evaluation of Different Page Allocation Strategies on High-Speed SSDs, In Proceedings of HotStorage, 2012.
Office Action issued by the Taiwanese Intellectual Property Office dated Aug. 28, 2019.

\* cited by examiner

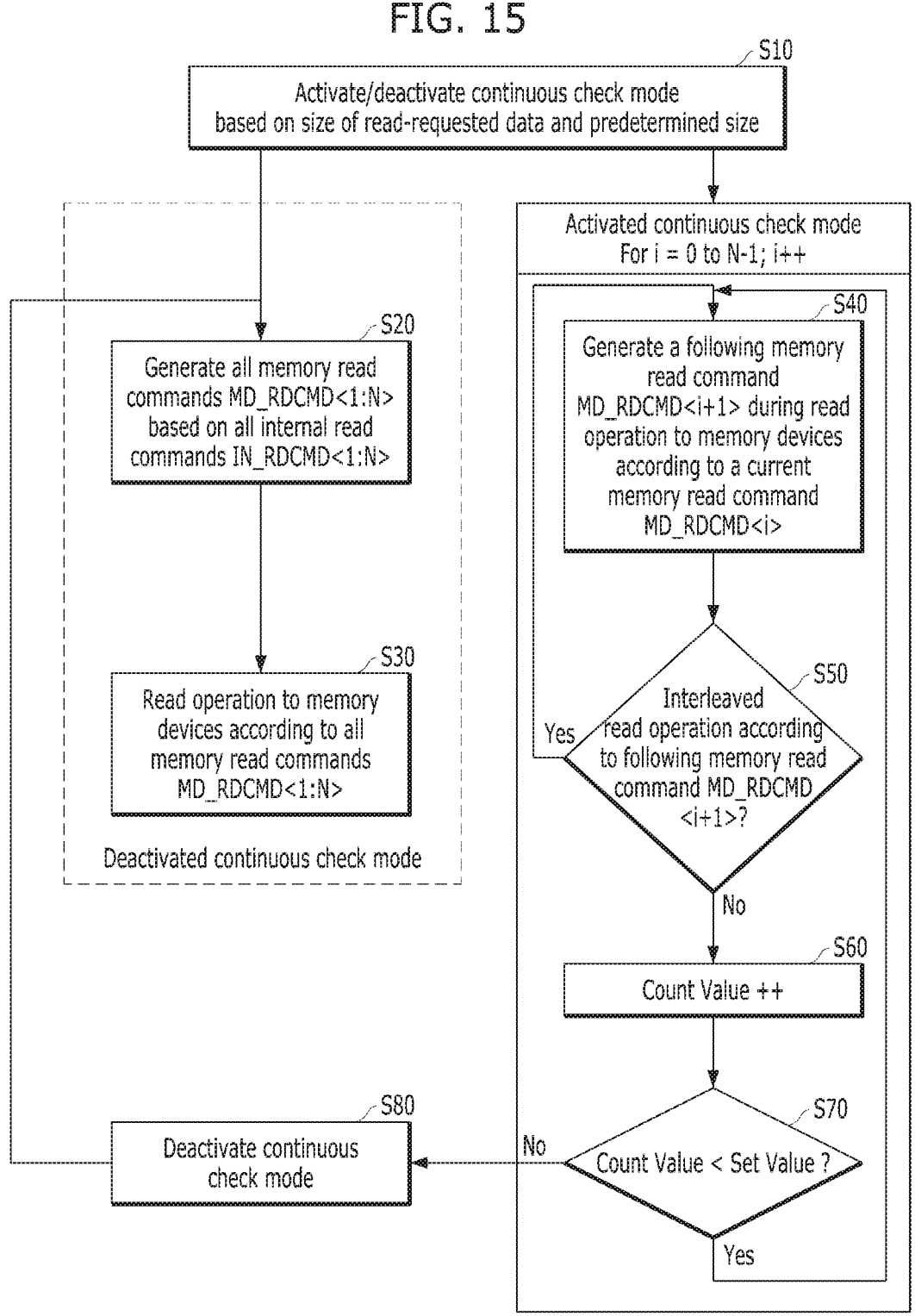

MEMORY SYSTEM AND OPERATING METHOD OF THE MEMORY SYSTEM

CROSS-REFERENCE TO RELATED APPLICATION

This application claims priority under 35 U.S.C. § 119 to Korean Patent Application No. 10-2015-0188677, filed on Dec. 29, 2015 in the Korean Intellectual Property Office, the disclosure of which is incorporated herein by reference in its entirety.

BACKGROUND

1. Field

Exemplary embodiments relate to a semiconductor design technology and, more particularly, to a memory system capable of performing both interleaved read and serial read operations and an operating method of the memory system.

2. Description of the Related Art

The computer environment paradigm has shifted to ubiquitous computing systems that can be used anytime and anywhere. Due to this fact, use of portable electronic devices such as, for example, mobile phones, digital cameras, and notebook computers has rapidly increased. These portable electronic devices generally use a memory system having memory devices, that is, a data storage device. The data storage device is used as a main memory device or an auxiliary memory device of the portable electronic devices.

Data storage devices using memory devices provide excellent stability, durability, high information access speed, and low power consumption, since they have no moving parts. Examples of data storage devices having such advantages include universal serial bus (USB) memory devices, memory cards having various interfaces, and solid state drives (SSD).

SUMMARY

Various embodiments are directed to a memory system capable of performing both interleaved read and serial read operations and an operating method of the memory system.

In an embodiment, a memory system may include: a plurality of memory devices; a host controller suitable for generating a plurality of internal read commands based on a size of read-requested data of an external read command and a minimum read size for each of the plurality of memory devices; and a memory controller suitable for generating following memory read commands based on following internal read commands among the internal read commands during an interleaved read operation to the memory devices according to current memory read commands corresponding to current internal read commands among the internal read commands.

A number of the internal read commands may depend on the size of read-requested data of an external read command and the minimum read size.

The host controller may be further suitable for: activating a continuous check mode when the size of read-requested data is greater than a predetermined multiple of the minimum read size, and deactivating the continuous check mode when the size of read-requested data is smaller than the predetermined multiple of the minimum read size.

The memory controller may generate, in the activated continuous check mode, the following memory read commands based on the following internal read commands among the internal read commands during the interleaved read operation to the memory devices according to the current memory read commands corresponding to the current internal read commands among the internal read commands.

The memory controller may be further suitable for sequentially generating, in the deactivated continuous check mode, all the memory read commands based on all the internal read commands, and then performing a serial read operation to the memory devices according to the sequentially generated memory read commands corresponding to all the internal read commands.

The memory controller may be further suitable for deactivating the activated continuous check mode when read operations to the memory devices according to a predetermined number of the memory read commands are not the interleaved read operations.

Each of the memory devices may include a plurality of planes, and the minimum read size is a unit size of data read from each of the planes through a single read operation.

The memory controller may deactivate the activated continuous check mode when the read operations according to the predetermined number of the memory read commands are to be performed to the same plane among the planes.

In an embodiment, an operating method of a memory system comprising a plurality of memory devices, the operating method may include: generating a plurality of internal read commands based on a size of read-requested data of an external read command and a minimum read size; and generating following memory read commands based on following internal read commands among the internal read commands during an interleaved read operation to the memory devices according to current memory read commands corresponding to current internal read commands among the internal read commands.

A number of the internal read commands may depend on the size of read-requested data of an external read command and the minimum read size.

The operating method may further include first mode setting for: activating a continuous check mode when the size of read-requested data is greater than a predetermined multiples of the minimum read size, and deactivating the continuous check mode when the size of read-requested data is smaller than the predetermined multiples of the minimum read size.

The generating of the following memory read commands may be performed in the activated continuous check mode.

The operating method may further include sequentially generating, in the deactivated continuous check mode, all the memory read commands based on all the internal read commands, and then performing a serial read operation to the memory devices according to the sequentially generated memory read commands corresponding to all the internal read commands.

The operating method may further include deactivating the activated continuous check mode when read operations to the memory devices according to a predetermined number of the memory read commands are not the interleaved read operations.

Each of the memory devices may include a plurality of planes, and the minimum read size may be a unit size of data read from each of the planes through a single read operation.

The deactivating of the activated continuous check mode may be performed when the read operations according to the predetermined number of the memory read commands are to be performed to the same plane among the planes.

BRIEF DESCRIPTION OF THE DRAWINGS

FIG. 15 is a diagram illustrating an operation of a memory controller shown in FIG. 12, according to an embodiment of the present invention.

DETAILED DESCRIPTION

Figure 1:
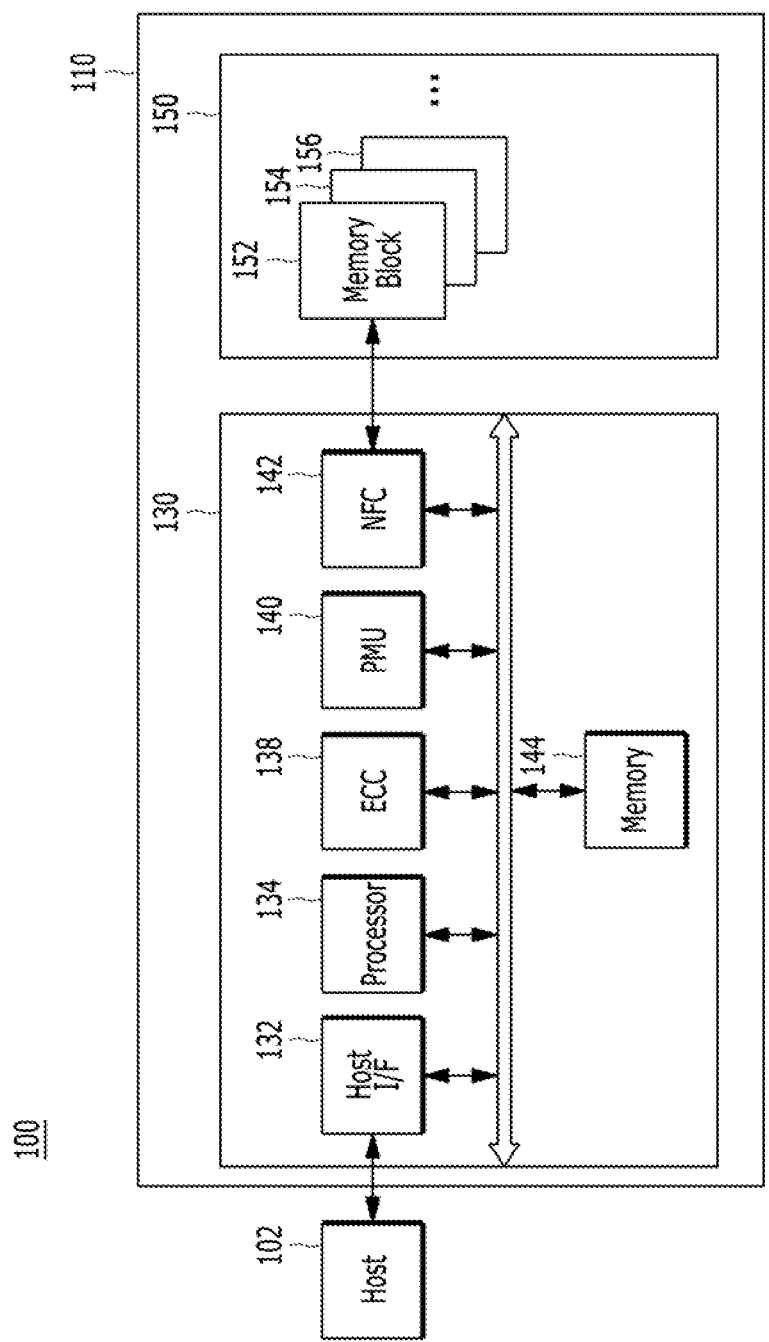
FIG. 1 is a diagram illustrating a data processing system including a memory system, according to an embodiment of the present invention.

Various embodiments will be described below in more detail with reference to the accompanying drawings. The present invention may, however, be embodied in different forms and should not be construed as being limited to the embodiments set forth herein. Rather, these embodiments are provided so that this disclosure will be thorough and complete, and will fully convey the present invention to those skilled in the art. Throughout the disclosure, like reference numerals refer to like parts throughout the various figures and embodiments of the present invention.

It will be understood that, although the terms "first", "second", "third", and the like may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises", "comprising", "includes", and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs. It will be further understood that terms, such as, for example, those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Hereinafter, the various embodiments of the present invention will be described in detail with reference to the attached drawings.

Referring now to FIG. 1 a data processing system is provided, according to an embodiment of the present invention.

According to the embodiment of FIG. 1, a data processing system 100 may include a host 102 and a memory system 110.

The host 102 may include, a portable electronic device, such as, for example, a mobile phone, an MP3 player and a laptop computer or an electronic device, such as, for example, a desktop computer, a game player, a TV and a projector.

The memory system 110 may operate in response to a request from the host 102. The memory system 110 may, for example, store data to be accessed by the host 102. The memory system 110 may be used as a main memory system or an auxiliary memory system of the host 102. The memory system 110 may be implemented with any one of various storage devices, according to the protocol of a host interface to be coupled electrically with the host 102. The memory system 110 may be implemented with any one of various storage devices, such as, for example, a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, such as, for example, a dynamic random access memory (DRAM) and a static random access memory (SRAM), or a nonvolatile memory device, such as, for example, a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM) and a resistive RAM (RRAM).

The memory system 110 may include a memory device 150 for storing data to be accessed by the host 102, and a controller 130 for controlling the storage of data in the memory device 150.

The controller 130 and the memory device 150 may be integrated into one semiconductor device. For instance, the controller 130 and the memory device 150 may be integrated into one semiconductor device configured as a solid state drive (SSD). When the memory system 110 is used as the SSD, the operation speed of the host 102 that is coupled electrically with the memory system 110 may be significantly increased.

The controller 130 and the memory device 150 may be integrated into one semiconductor device configured as a memory card, such as, for example, a Personal Computer Memory Card International Association (PCMCIA) card, a compact flash (CF) card, a smart media (SM) card (SMC), a memory stick, a multimedia card (MMC), an RS-MMC and a micro-MMC, a secure digital (SD) card, a mini-SD, a micro-SD and an SDHC, and a universal flash storage (UFS) device.

For another instance, the memory system 110 may configure a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, or one of various component elements configuring a computing system.

The memory device 150 of the memory system 110 may retain stored data when power supply is interrupted. The memory device 150 may store the data provided from the host 102 during a write operation. The memory device 150 may provide stored data to the host 102 during a read operation.

The memory device 150 may include a plurality of memory blocks 152, 154 and 156. Each of the memory blocks 152, 154 and 156 may include a plurality of pages. Each of the pages may include a plurality of memory cells to which a plurality of word lines (WL) are coupled electrically. The memory device 150 may be a nonvolatile memory device, for example, a flash memory. The flash memory may have a three-dimensional (3D) stack structure. The structure of the memory device 150 and the three-dimensional (3D) stack structure of the memory device 150 will be described later in detail with reference to FIGS. 2 to 11.

The controller 130 of the memory system 110 may control the memory device 150 in response to a request from the host 102. The controller 130 may provide the data read from the memory device 150, to the host 102, and store the data provided from the host 102 into the memory device 150. To this end, the controller 130 may control the overall operations of the memory device 150, such as, for example, read, write, program and erase operations.

For example, according to the embodiment of FIG. 1, the controller 130 may include a host interface unit 132, a processor 134, an error correction code (ECC) unit 138, a power management unit 140, a NAND flash controller 142, and a memory 144.

The host interface unit 132 may process commands and data provided from the host 102, and may communicate with the host 102 through at least one of various interface protocols such as, for example, universal serial bus (USB), multimedia card (MMC), peripheral component interconnect-express (PCI-E), serial attached SCSI (SAS), serial advanced technology attachment (SATA), parallel advanced technology attachment (PATA), small computer system interface (SCSI), enhanced small disk interface (ESDI), and integrated drive electronics (IDE).

The ECC unit 138 may detect and correct errors in the data read from the memory device 150 during the read operation. The ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on a coded modulation, such as, for example, a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and the like. The ECC unit 138 may include all circuits, systems or devices for the error correction operation.

The PMU 140 may provide and manage power for the controller 130, that is, power for the component elements included in the controller 130.

The NFC 142 may serve as a memory interface between the controller 130 and the memory device 150 to allow the controller 130 to control the memory device 150 in response to a request from the host 102. The NFC 142 may generate control signals for the memory device 150 and process data under the control of the processor 134 when the memory device 150 is a flash memory and, in particular, when the memory device 150 is a NAND flash memory.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150 for such operations as read, write, program and erase operations.

The memory 144 may be implemented with a volatile memory. For example, the memory 144 may be implemented with a static random access memory (SRAM) or a dynamic random access memory (DRAM). As described above, the memory 144 may store data used by the host 102 and the memory device 150 for the read and write operations. To store the data, the memory 144 may include a program memory, a data memory, a write buffer, a read buffer, a map buffer, and the like.

The processor 134 may the control general operations of the memory system 110. The processor 134 may control a write operation or a read operation for the memory device 150, in response to a write or a read request received from the host 102. The processor 134 may drive firmware, also referred to as a flash translation layer (FTL), to control the general operations of the memory system 110. The processor 134 may, for example, be implemented with a microprocessor or a central processing unit (CPU).

A management unit (not shown) may be included in the processor 134, and may perform bad block management of the memory device 150. The management unit may find bad memory blocks included in the memory device 150, which are in unsatisfactory condition for further use, and perform bad block management on the bad memory blocks. When the memory device 150 is a flash memory, for example, a NAND flash memory, a program failure may occur during the write operation, for example, during the program operation, due to characteristics of a NAND logic function. During bad block management, the data of the program-failed memory block or the bad memory block may be programmed into a new memory block. Also, the bad blocks due to a program fail seriously deteriorate the utilization efficiency of the memory device 150 having a 3D stack structure and the reliability of the memory system 100, hence, reliable bad block management is required.

Figure 2:
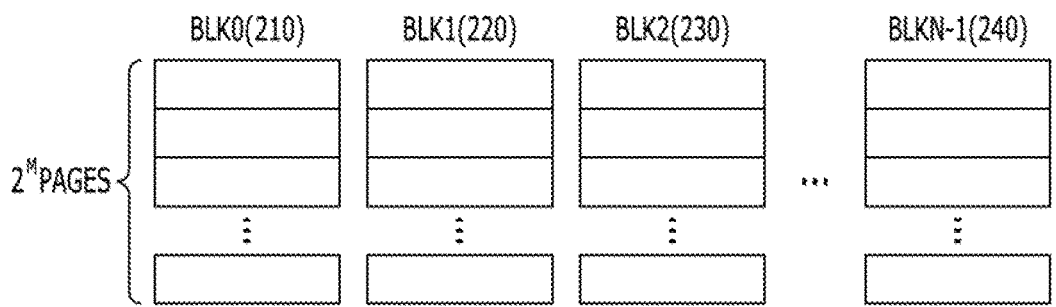
FIG. 2 is a diagram illustrating a memory device employed in the memory system shown in FIG. 1, according to an embodiment of the present invention.

FIG. 2 is a schematic diagram illustrating the memory device 150 shown in FIG. 1, according to an embodiment of the invention.

According to the embodiment of FIG. 2, the memory device 150 may include a plurality of memory blocks, for example, zeroth to $(N-1)^{th}$ blocks 210 to 240. Each of the plurality of memory blocks 210 to 240 may include a plurality of pages, for example, $2^M$ number of pages ($2^M$ PAGES). The number of memory blocks and pages may vary based on design. Each of the plurality of pages may include a plurality of memory cells to which a plurality of word lines are coupled electrically.

Also, the memory device 150 may include a plurality of memory blocks, as single level cell (SLC) memory blocks and multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data, for example, two or more-bit data. An MLC memory block including a plurality of pages which are implemented with memory cells that are each capable of storing 3-bit data is also referred to as a triple level cell (TLC) memory block.

Each of the plurality of memory blocks 210 to 240 may store the data provided from the host device 102 during a write operation. Each of the plurality of memory blocks 210 to 240 may provide stored data to the host 102 during a read operation.

Figure 3:
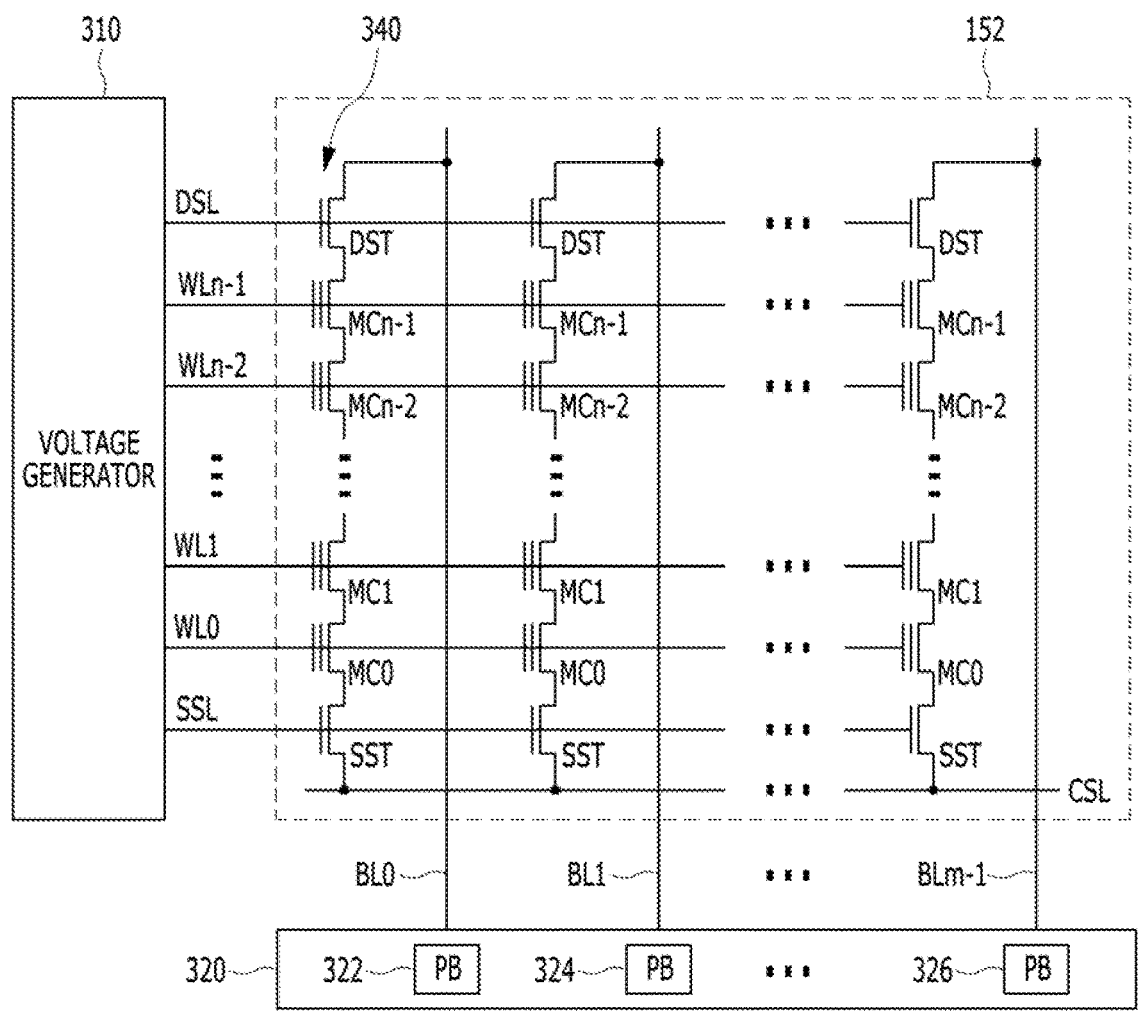
FIG. 3 is a circuit diagram illustrating a memory block in a memory device, according to an embodiment of the present invention.

FIG. 3 is a circuit diagram illustrating one of the plurality of memory blocks 152 to 156 shown in FIG. 1, according to an embodiment of the present invention.

According to the embodiment of FIG. 3, the memory block 152 of the memory device 150 may include a plurality of cell strings 340 which are coupled electrically to bit lines BL0 to BLm-1, respectively. The cell string 340 of each column may include at least one drain select transistor DST and at least one source select transistor SST. A plurality of memory cells or a plurality of memory cell transistors MC0 to MCn-1 may be coupled electrically in series between the select transistors DST and SST. The respective memory cells MC0 to MCn-1 may be configured by multi-level cells (MLC) each of which stores data information of a plurality of bits. The strings 340 may be coupled electrically to the corresponding bit lines BL0 to BLm-1, respectively. For reference, in FIG. 3, 'DSL' denotes a drain select line, 'SSL' denotes a source select line, and 'CSL' denotes a common source line.

While FIG. 3 shows, as an example, the memory block 152 which is configured by NAND flash memory cells, it is to be noted that the memory block 152 of the memory device 150 according to the embodiment is not limited to NAND flash memory and may be realized by NOR flash memory, hybrid flash memory in which at least two kinds of memory cells are combined, or one-NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A voltage supply block 310 of the memory device 150 may provide word line voltages, for example, a program voltage, a read voltage and a pass voltage, to be supplied to respective word lines according to an operation mode and voltages to be supplied to bulks, for example, well regions in which the memory cells are formed. The voltage supply block 310 may perform a voltage generating operation under the control of a control circuit (not shown). The voltage supply block 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit, and may serve as a sense amplifier or a write driver according to an operation mode. During a verification/normal read operation, the read/write circuit 320 may serve as a sense amplifier for reading data from the memory cell array. Also, during a program operation, the read/write circuit 320 may serve as a write driver which drives bit lines according to data to be stored in the memory cell array. The read/write circuit 320 may receive data to be written in the memory cell array, from a buffer (not shown), during the program operation, and may drive the bit lines according to the inputted data. To this end, the read/write circuit 320 may include a plurality of page buffers 322, 324 and 326 respectively corresponding to columns (or bit lines) or pairs of columns (or pairs of bit lines), and a plurality of latches (not shown) may be included in each of the page buffers 322, 324 and 326.

FIGS. 4 to 11 are schematic diagrams illustrating the memory device 150 shown in FIG. 1.

Figure 4:
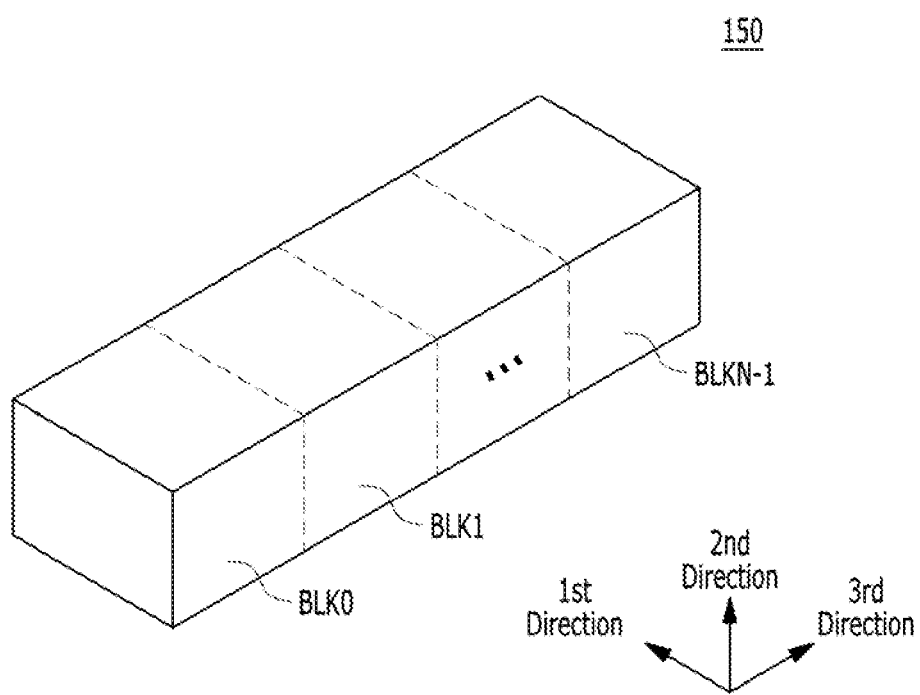
FIGS. 4 to 11 are diagrams schematically illustrating various aspects of the memory device shown in FIG. 2.

FIG. 4 is a block diagram illustrating an example of the plurality of memory blocks 152 to 156 of the memory device 150 shown in FIG. 1.

According to the embodiment of FIG. 4, the memory device 150 may include a plurality of memory blocks BLK0 to BLKN-1, and each of the memory blocks BLK0 to BLKN-1 may be realized in a three-dimensional (3D) structure or a vertical structure. The respective memory blocks BLK0 to BLKN-1 may include structures which extend in first to third directions, for example, an x-axis direction, a y-axis direction and a z-axis direction.

The respective memory blocks BLK0 to BLKN-1 may include a plurality of NAND strings NS which extend in the second direction. The plurality of NAND strings NS may be provided in the first direction and the third direction. Each NAND string NS may be coupled electrically to a bit line BL, at least one source select line SSL, at least one ground select line GSL, a plurality of word lines WL, at least one dummy word line DWL, and a common source line CSL. Namely, the respective memory blocks BLK0 to BLKN−1 may be coupled electrically to a plurality of bit lines BL, a plurality of source select lines SSL, a plurality of ground select lines GSL, a plurality of word lines WL, a plurality of dummy word lines DWL, and a plurality of common source lines CSL.

Figure 5:
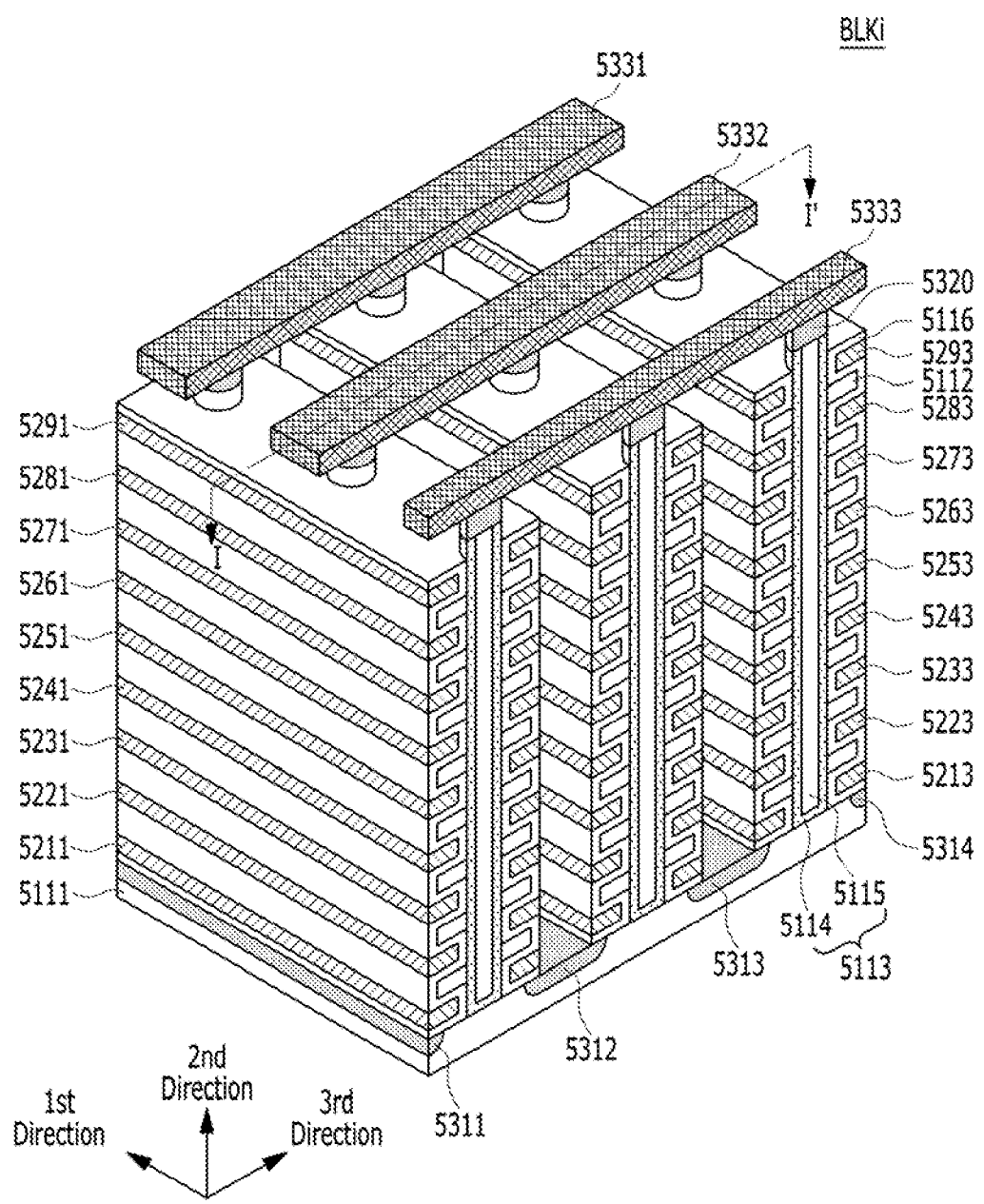
Figure 6:
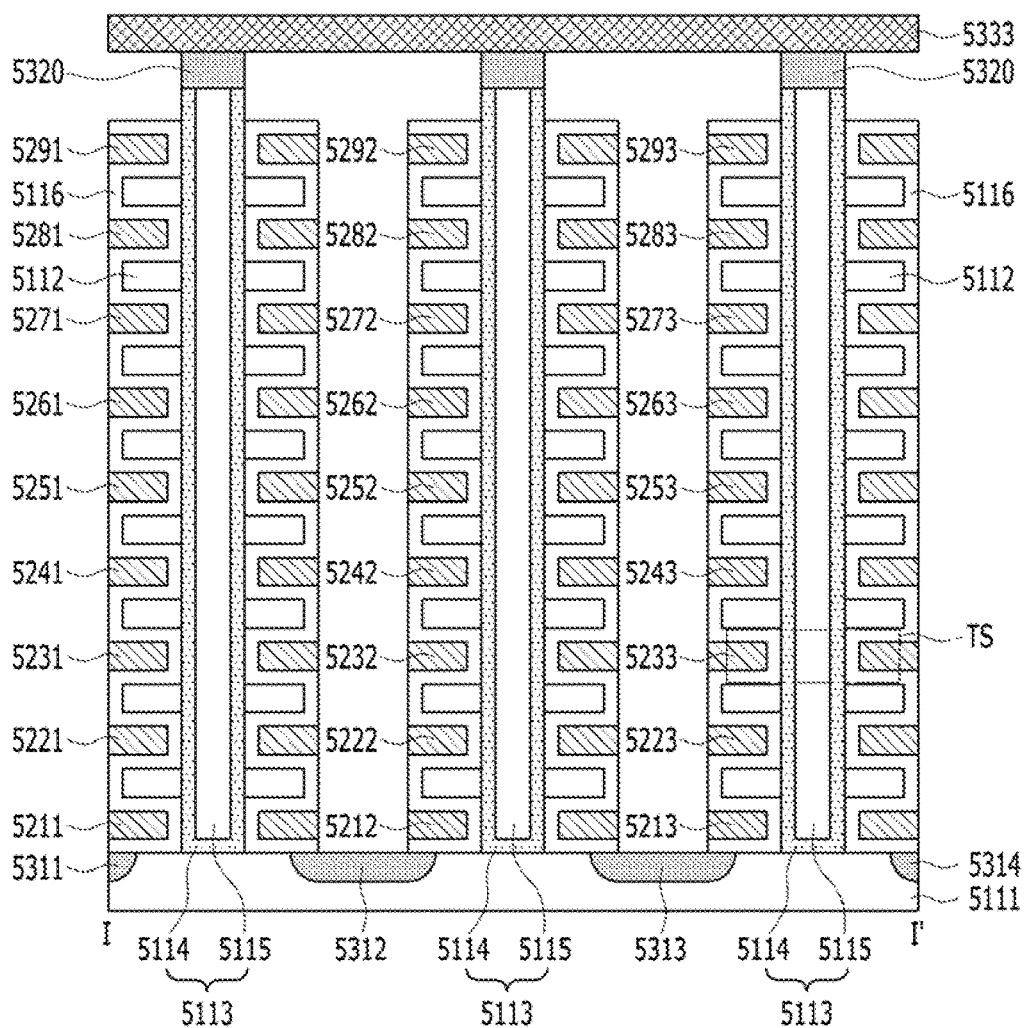

FIG. 5 is a perspective view of one BLKi of the plural memory blocks BLK0 to BLKN−1 shown in FIG. 4. FIG. 6 is a cross-sectional view taken along a line I-I' of the memory block BLKi shown in FIG. 5.

According to the embodiment of FIGS. 5 and 6, a memory block BLKi among the plurality of memory blocks of the memory device 150 may include a structure extending in the first to third directions.

A substrate 5111 may be provided. The substrate 5111 may include a silicon material doped with a first type impurity. The substrate 5111 may include a silicon material doped with a p-type impurity or may be a p-type well, for example, a pocket p-well, and include an n-type well which surrounds the p-type well. While it is assumed that the substrate 5111 is p-type silicon, it is to be noted that the substrate 5111 is not limited to being p-type silicon.

A plurality of doping regions 5311 to 5314 which extend in the first direction may be provided over the substrate 5111. The plurality of doping regions 5311 to 5314 may contain a second type of impurity that is different from the substrate 5111. The plurality of doping regions 5311 to 5314 may be doped with an n-type impurity. While it is assumed here that first to fourth doping regions 5311 to 5314 are n-type, it is to be noted that the first to fourth doping regions 5311 to 5314 are not limited to being n-type.

In the region over the substrate 5111 between the first and second doping regions 5311 and 5312, a plurality of dielectric materials 5112 which extend in the first direction may be sequentially provided in the second direction. The dielectric materials 5112 and the substrate 5111 may be separated from one another by a predetermined distance in the second direction. The dielectric materials 5112 may be separated from one another by a predetermined distance in the second direction. The dielectric materials 5112 may include a dielectric material such as, for example, silicon oxide.

In the region over the substrate 5111 between the first and second doping regions 5311 and 5312, a plurality of pillars 5113 which are sequentially disposed in the first direction and pass through the dielectric materials 5112 in the second direction may be provided. The plurality of pillars 5113 may respectively pass through the dielectric materials 5112 and may be coupled electrically with the substrate 5111. Each pillar 5113 may be configured by a plurality of materials. The surface layer 5114 of each pillar 5113 may include a silicon material doped with the first type of impurity. The surface layer 5114 of each pillar 5113 may include a silicon material doped with the same type of impurity as the substrate 5111. While it is assumed here that the surface layer 5114 of each pillar 5113 may include p-type silicon, the surface layer 5114 of each pillar 5113 is not limited to being p-type silicon.

An inner layer 5115 of each pillar 5113 may be formed of a dielectric material. The inner layer 5115 of each pillar 5113 may be filled by a dielectric material such as, for example, silicon oxide.

In the region between the first and second doping regions 5311 and 5312, a dielectric layer 5116 may be provided along the exposed surfaces of the dielectric materials 5112, the pillars 5113 and the substrate 5111. The thickness of the dielectric layer 5116 may be less than half of the distance between the dielectric materials 5112. In other words, a region in which a material other than the dielectric material 5112 and the dielectric layer 5116 may be disposed, may be provided between (i) the dielectric layer 5116 provided over the bottom surface of a first dielectric material of the dielectric materials 5112 and (ii) the dielectric layer 5116 provided over the top surface of a second dielectric material of the dielectric materials 5112. The dielectric materials 5112 lie below the first dielectric material.

In the region between the first and second doping regions 5311 and 5312, conductive materials 5211 to 5291 may be provided over the exposed surface of the dielectric layer 5116. The conductive material 5211 extending in the first direction may be provided between the dielectric material 5112 adjacent to the substrate 5111 and the substrate 5111. In particular, the conductive material 5211 extending in the first direction may be provided between (i) the dielectric layer 5116 disposed over the substrate 5111 and (ii) the dielectric layer 5116 disposed over the bottom surface of the dielectric material 5112 adjacent to the substrate 5111.

The conductive material extending in the first direction may be provided between (i) the dielectric layer 5116 disposed over the top surface of one of the dielectric materials 5112 and (ii) the dielectric layer 5116 disposed over the bottom surface of another dielectric material of the dielectric materials 5112, which is disposed over the certain dielectric material 5112. The conductive materials 5221 to 5281 which extend in the first direction may be provided between the dielectric materials 5112. The conductive material 5291 extending in the first direction may be provided over the uppermost dielectric material 5112. The conductive materials 5211 to 5291 which extend in the first direction may be a metallic material. The conductive materials 5211 to 5291 which extend in the first direction may be a conductive material such as, for example, polysilicon.

In the region between the second and third doping regions 5312 and 5313, the same structures as the structures between the first and second doping regions 5311 and 5312 may be provided. For example, in the region between the second and third doping regions 5312 and 5313, the plurality of dielectric materials 5112 which extend in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113, and the plurality of conductive materials 5212 to 5292 which extend in the first direction may be provided.

In the region between the third and fourth doping regions 5313 and 5314, the same structures as between the first and second doping regions 5311 and 5312 may be provided. For example, in the region between the third and fourth doping regions 5313 and 5314, the plurality of dielectric materials 5112 which extend in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113, and the plurality of conductive materials 5213 to 5293 which extend in the first direction may be provided.

Drains 5320 may be respectively provided over the plurality of pillars 5113. The drains 5320 may be silicon materials doped with second type impurities. The drains 5320 may be silicon materials doped with n-type impurities. While it is assumed for the sake of convenience that the drains 5320 include n-type silicon, it is to be noted that the drains 5320 are not limited to being n-type silicon. For example, the width of each drain 5320 may be larger than the width of each corresponding pillar 5113. Each drain 5320 may be provided in the shape of a pad over the top surface of each corresponding pillar 5113.

Conductive materials 5331 to 5333 which extend in the third direction may be provided over the drains 5320. The conductive materials 5331 to 5333 may be sequentially disposed in the first direction. The respective conductive materials 5331 to 5333 may be coupled electrically with the drains 5320 of corresponding regions. The drains 5320 and the conductive materials 5331 to 5333 which extend in the third direction may be coupled electrically with through contact plugs. The conductive materials 5331 to 5333 which extend in the third direction may be a metallic material. The conductive materials 5331 to 5333 which extend in the third direction may be a conductive material such as, for example, polysilicon.

In FIGS. 5 and 6, the respective pillars 5113 may form strings together with the dielectric layer 5116 and the conductive materials 5211 to 5291, 5212 to 5292 and 5213 to 5293 which extend in the first direction. The respective pillars 5113 may form NAND strings NS together with the dielectric layer 5116 and the conductive materials 5211 to 5291, 5212 to 5292 and 5213 to 5293 which extend in the first direction. Each NAND string NS may include a plurality of transistor structures TS.

Figure 7:
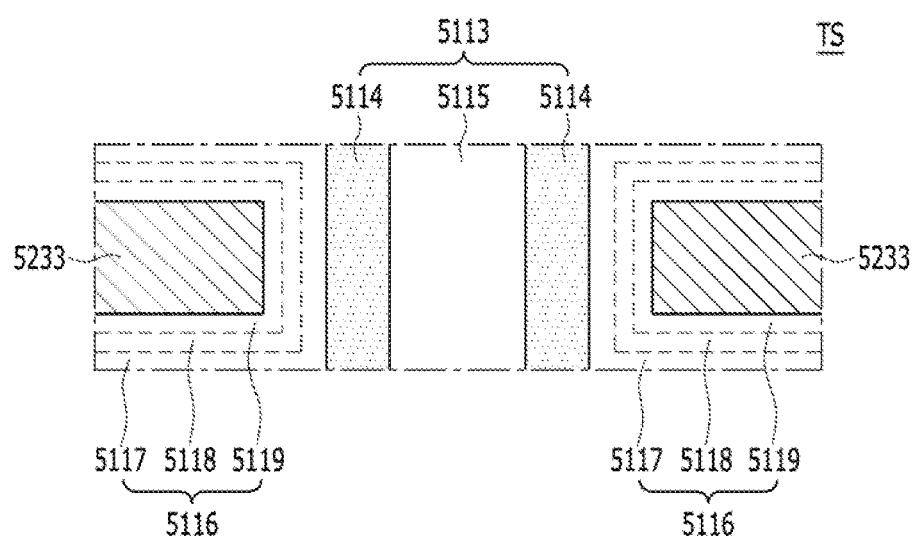

FIG. 7 is a cross-sectional view of the transistor structure TS shown in FIG. 6.

According to the embodiment of FIG. 7, in the transistor structure TS shown in FIG. 6, the dielectric layer 5116 may include first to third sub dielectric layers 5117, 5118 and 5119.

The surface layer 5114 of p-type silicon in each of the pillars 5113 may serve as a body. The first sub dielectric layer 5117 adjacent to the pillar 5113 may serve as a tunneling dielectric layer, and may include a thermal oxidation layer.

The second sub dielectric layer 5118 may serve as a charge storing layer. The second sub dielectric layer 5118 may serve as a charge capturing layer, and may include a nitride layer or a metal oxide layer such as, for example, an aluminum oxide layer, a hafnium oxide layer, or the like.

The third sub dielectric layer 5119 adjacent to the conductive material 5233 may serve as a blocking dielectric layer. The third sub dielectric layer 5119 adjacent to the conductive material 5233 extending in the first direction may be formed as a single layer or multiple layers. The third sub dielectric layer 5119 may be a high-k dielectric layer such as, for example, an aluminum oxide layer, a hafnium oxide layer, or the like, which has a dielectric constant greater than the first and second sub dielectric layers 5117 and 5118.

The conductive material 5233 may serve as a gate or a control gate. That is, the gate or the control gate 5233, the blocking dielectric layer 5119, the charge storing layer 5118, the tunneling dielectric layer 5117 and the body 5114 may form a transistor or a memory cell transistor structure. For example, the first to third sub dielectric layers 5117 to 5119 may form an oxide-nitride-oxide (ONO) structure. In the embodiment, for the sake of convenience, the surface layer 5114 of p-type silicon in each of the pillars 5113 will be referred to as a body in the second direction.

The memory block BLKi may include the plurality of pillars 5113. Namely, the memory block BLKi may include the plurality of NAND strings NS. In detail, the memory block BLKi may include the plurality of NAND strings NS which extend in the second direction or a direction perpendicular to the substrate 5111.

Each NAND string NS may include the plurality of transistor structures TS which are disposed in the second direction. At least one of the plurality of transistor structures TS of each NAND string NS may serve as a string source transistor SST. At least one of the plurality of transistor structures TS of each NAND string NS may serve as a ground select transistor GST.

The gates or control gates may correspond to the conductive materials 5211 to 5291, 5212 to 5292 and 5213 to 5293 which extend in the first direction. In other words, the gates or the control gates may extend in the first direction and form word lines and at least two select lines, at least one source select line SSL and at least one ground select line GSL.

The conductive materials 5331 to 5333 which extend in the third direction may be coupled electrically to one end of the NAND strings NS. The conductive materials 5331 to 5333 which extend in the third direction may serve as bit lines BL. That is, in one memory block BLKi, the plurality of NAND strings NS may be coupled electrically to one bit line BL.

The second type doping regions 5311 to 5314 which extend in the first direction may be provided to the other ends of the NAND strings NS. The second type doping regions 5311 to 5314 which extend in the first direction may serve as common source lines CSL.

Namely, the memory block BLKi may include a plurality of NAND strings NS which extend in a direction perpendicular to the substrate 5111, e.g., the second direction, and may serve as a NAND flash memory block, for example, of a charge capturing type memory, in which a plurality of NAND strings NS are coupled electrically to one bit line BL.

While it is illustrated in FIGS. 5 to 7 that the conductive materials 5211 to 5291, 5212 to 5292 and 5213 to 5293 which extend in the first direction are provided in 9 layers, it is to be noted that the conductive materials 5211 to 5291, 5212 to 5292 and 5213 to 5293 which extend in the first direction are not limited to being provided in 9 layers. For example, conductive materials which extend in the first direction may be provided in 8 layers, 16 layers or any multiple of layers. In other words, in one NAND string NS, the number of transistors may be 8, 16 or more.

While it is illustrated in FIGS. 5 to 7 that 3 NAND strings NS are coupled electrically to one bit line BL, it is to be noted that the embodiment is not limited to having 3 NAND strings NS that are coupled electrically to one bit line BL. In the memory block BLKi, m number of NAND strings NS may be coupled electrically to one bit line BL, m being a positive integer. According to the number of NAND strings NS which are coupled electrically to one bit line BL, the number of conductive materials 5211 to 5291, 5212 to 5292 and 5213 to 5293 which extend in the first direction and the number of common source lines 5311 to 5314 may be controlled as well.

Further, while it is illustrated in FIGS. 5 to 7 that 3 NAND strings NS are coupled electrically to one conductive material extending in the first direction, it is to be noted that the embodiment is not limited to having 3 NAND strings NS coupled electrically to one conductive material extending in the first direction. For example, n number of NAND strings NS may be coupled electrically to one conductive material extending in the first direction, n being a positive integer. According to the number of NAND strings NS which are coupled electrically to one conductive material extending in the first direction, the number of bit lines 5331 to 5333 may be controlled as well.

Figure 8:
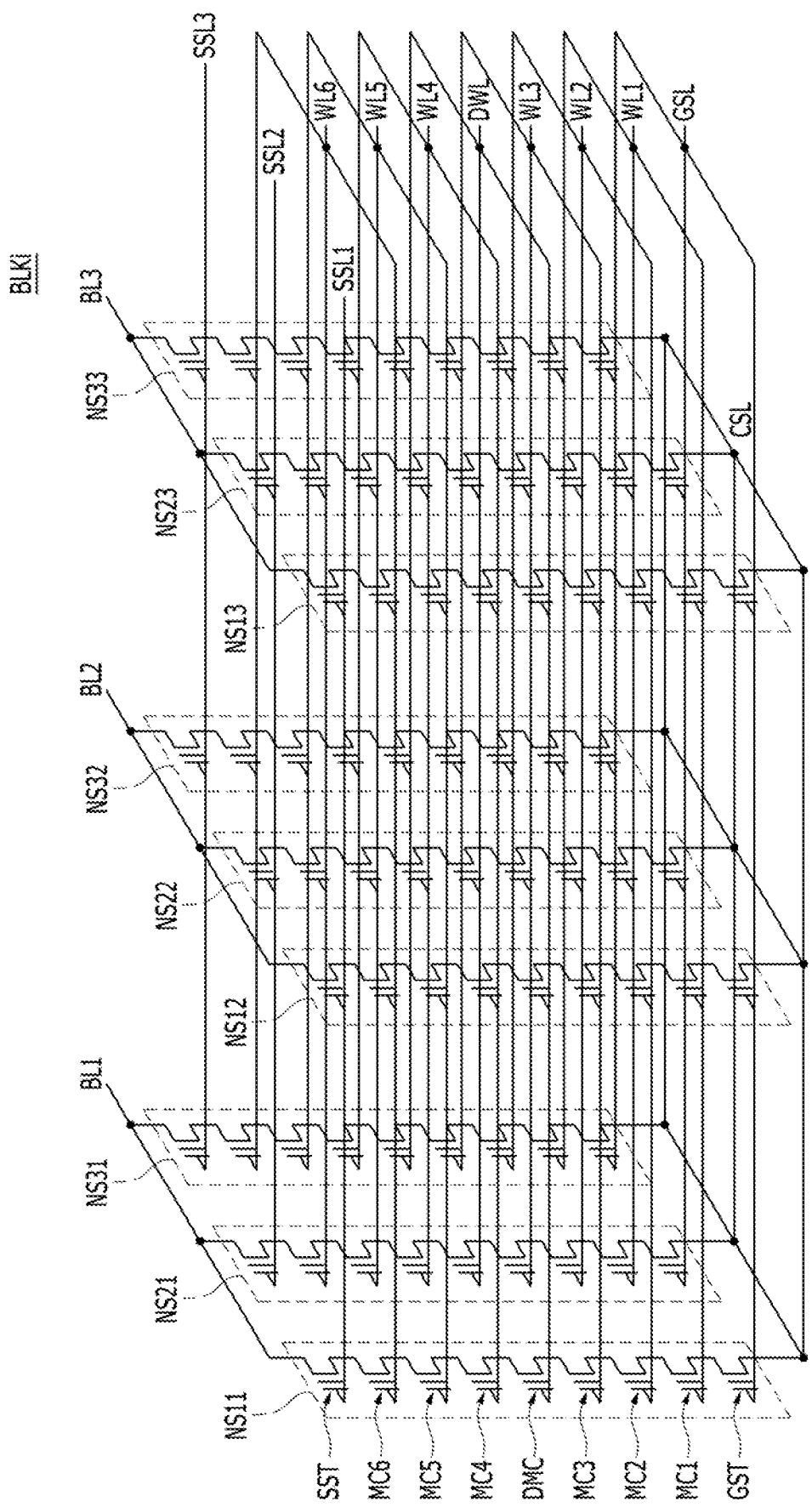

FIG. 8 is an equivalent circuit diagram illustrating the memory block BLKi having a first structure described with reference to FIGS. 5 to 7.

According to the embodiment of FIG. 8, in a block BLKi having the first structure, NAND strings NS11 to NS31 may be provided between a first bit line BL1 and a common source line CSL. The first bit line BL1 may correspond to the conductive material 5331 of FIGS. 5 and 6, extending in the third direction. NAND strings NS12 to NS32 may be provided between a second bit line BL2 and the common source line CSL. The second bit line BL2 may correspond to the conductive material 5332 of FIGS. 5 and 6, extending in the third direction. NAND strings NS13 to NS33 may be provided between a third bit line BL3 and the common source line CSL. The third bit line BL3 may correspond to the conductive material 5333 of FIGS. 5 and 6, extending in the third direction.

A source select transistor SST of each NAND string NS may be coupled electrically to a corresponding bit line BL. A ground select transistor GST of each NAND string NS may be coupled electrically to the common source line CSL. Memory cells MC may be provided between the source select transistor SST and the ground select transistor GST of each NAND string NS.

In this example, NAND strings NS may be defined by units of rows and columns and NAND strings NS which are coupled electrically to one bit line may form one column. The NAND strings NS11 to NS31 which are coupled electrically to the first bit line BL1 may correspond to a first column, the NAND strings NS12 to NS32 which are coupled electrically to the second bit line BL2 may correspond to a second column, and the NAND strings NS13 to NS33 which are coupled electrically to the third bit line BL3 may correspond to a third column. NAND strings NS which are coupled electrically to one source select line SSL may form one row. The NAND strings NS11 to NS13 which are coupled electrically to a first source select line SSL1 may form a first row, the NAND strings NS21 to NS23 which are coupled electrically to a second source select line SSL2 may form a second row, and the NAND strings NS31 to NS33 which are coupled electrically to a third source select line SSL3 may form a third row.

In each NAND string NS, a height may be defined. In each NAND string NS, the height of a memory cell MC1 adjacent to the ground select transistor GST may have a value '1'. In each NAND string NS, the height of a memory cell may increase as the memory cell gets closer to the source select transistor SST when measured from the substrate 5111. In each NAND string NS, the height of a memory cell MC6 adjacent to the source select transistor SST may be 7.

The source select transistors SST of the NAND strings NS in the same row may share the source select line SSL. The source select transistors SST of the NAND strings NS in different rows may be respectively coupled electrically to the different source select lines SSL1, SSL2 and SSL3.

The memory cells at the same height in the NAND strings NS in the same row may share a word line WL. That is, at the same height, the word lines WL coupled electrically to the memory cells MC of the NAND strings NS in different rows may be coupled electrically. Dummy memory cells DMC at the same height in the NAND strings NS of the same row may share a dummy word line DWL. Namely, at the same height or level, the dummy word lines DWL coupled electrically to the dummy memory cells DMC of the NAND strings NS in different rows may be coupled electrically.

The word lines WL or the dummy word lines DWL located at the same level or height or layer may be coupled electrically with one another at layers where the conductive materials 5211 to 5291, 5212 to 5292 and 5213 to 5293 which extend in the first direction may be provided. The conductive materials 5211 to 5291, 5212 to 5292 and 5213 to 5293 which extend in the first direction may be coupled electrically in common to upper layers through contacts. At the upper layers, the conductive materials 5211 to 5291, 5212 to 5292 and 5213 to 5293 which extend in the first direction may be coupled electrically. In other words, the ground select transistors GST of the NAND strings NS in the same row may share the ground select line GSL. Further, the ground select transistors GST of the NAND strings NS in different rows may share the ground select line GSL. That is, the NAND strings NS11 to NS13, NS21 to NS23 and NS31 to NS33 may be coupled electrically to the ground select line GSL.

The common source line CSL may be coupled electrically to the NAND strings NS. Over the active regions and over the substrate 5111, the first to fourth doping regions 5311 to 5314 may be coupled electrically. The first to fourth doping regions 5311 to 5314 may be coupled electrically to an upper layer through contacts and, at the upper layer, the first to fourth doping regions 5311 to 5314 may be coupled electrically.

Namely, as shown in FIG. 8, the word lines WL of the same height or level may be coupled electrically. Accordingly, when a word line WL at a specific height is selected, all NAND strings NS which are coupled electrically to the word line WL may be selected. The NAND strings NS in different rows may be coupled electrically to different source select lines SSL. Accordingly, among the NAND strings NS coupled electrically to the same word line WL, by selecting one of the source select lines SSL1 to SSL3, the NAND strings NS in the unselected rows may be electrically isolated from the bit lines BL1 to BL3. In other words, by selecting one of the source select lines SSL1 to SSL3, a row of NAND strings NS may be selected. Moreover, by selecting one of the bit lines BL1 to BL3, the NAND strings NS in the selected rows may be selected in units of columns.

In each NAND string NS, a dummy memory cell DMC may be provided. In FIG. 8, the dummy memory cell DMC may be provided between a third memory cell MC3 and a fourth memory cell MC4 in each NAND string NS. That is, first to third memory cells MC1 to MC3 may be provided between the dummy memory cell DMC and the ground select transistor GST. Fourth to sixth memory cells MC4 to MC6 may be provided between the dummy memory cell DMC and the source select transistor SST. The memory cells MC of each NAND string NS may be divided into memory cell groups by the dummy memory cell DMC. In the divided memory cell groups, memory cells, for example, MC1 to MC3, adjacent to the ground select transistor GST may be referred to as a lower memory cell group, and memory cells, for example, MC4 to MC6, adjacent to the string select transistor SST may be referred to as an upper memory cell group.

Hereinbelow, detailed descriptions will be made with reference to FIGS. 9 to 11, which show the memory device in the memory system according to an embodiment implemented with a three-dimensional (3D) nonvolatile memory device different from the first structure.

Figure 9:
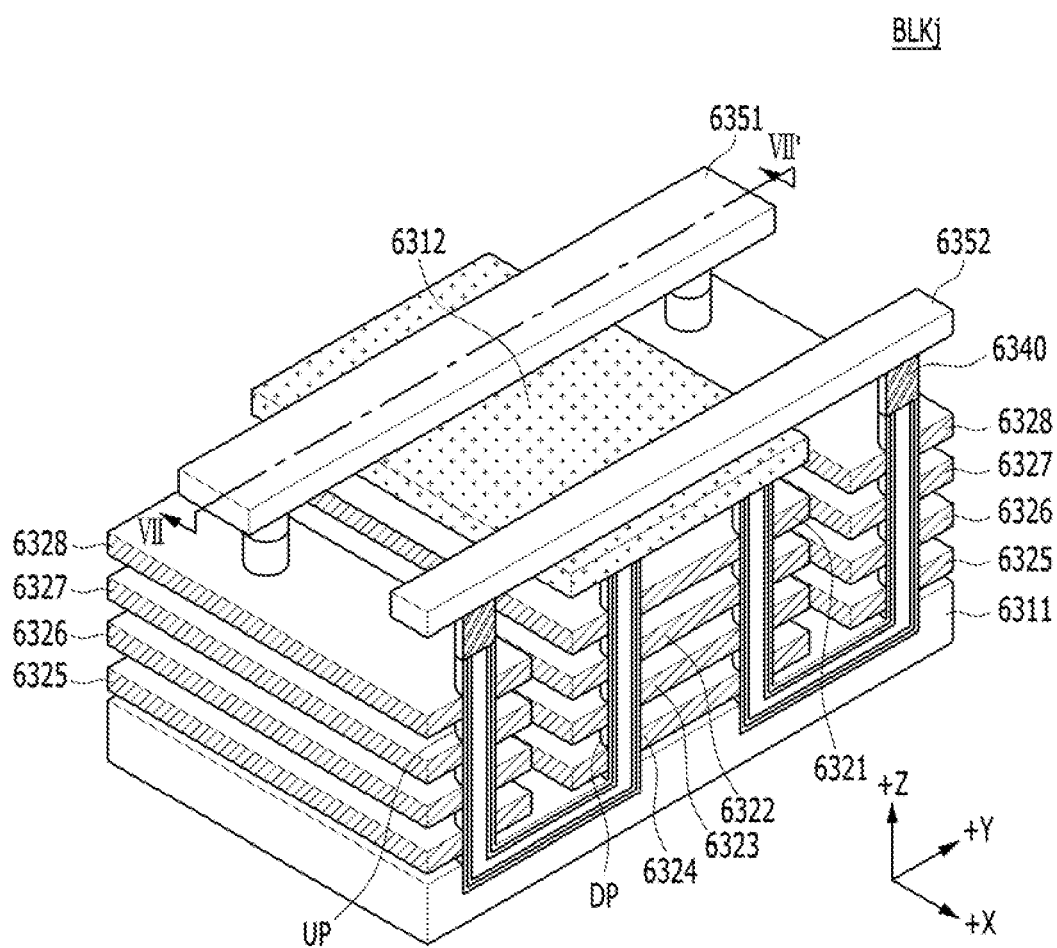

FIG. 9 is a perspective view schematically illustrating the memory device implemented with the three-dimensional (3D) nonvolatile memory device, which is different from the first structure described above with reference to FIGS. 5 to 8, and showing a memory block BLKj of the plurality of memory blocks of FIG. 4. FIG. 10 is a cross-sectional view illustrating the memory block BLKj taken along the line VII-VII' of FIG. 9.

Figure 10:
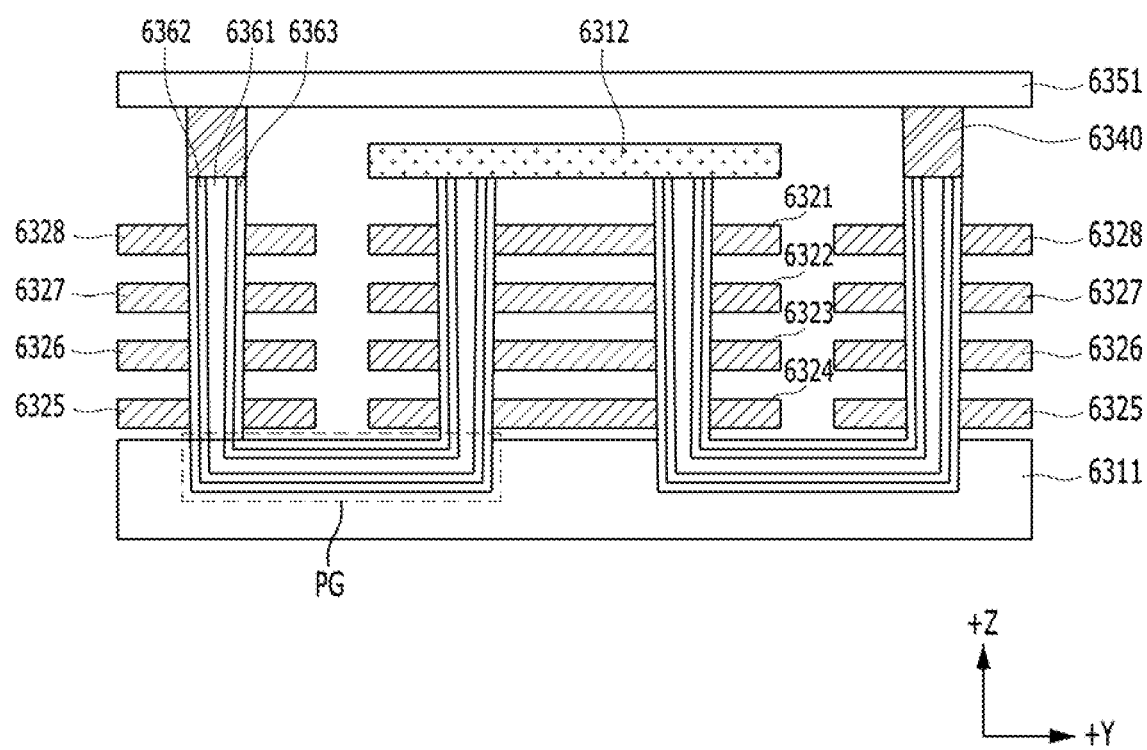

According to the embodiment of FIGS. 9 and 10, the memory block BLKj among the plurality of memory blocks of the memory device 150 of FIG. 1 may include structures which extend in the first to third directions.

A substrate 6311 may be provided. For example, the substrate 6311 may include a silicon material doped with a first type impurity. For example, the substrate 6311 may include a silicon material doped with a p-type impurity or may be a p-type well, for example, a pocket p-well, and include an n-type well which surrounds the p-type well. While it is assumed in the embodiment for the sake of convenience that the substrate 6311 is p-type silicon, it is to be noted that the substrate 6311 is not limited to being p-type silicon.

First to fourth conductive materials 6321 to 6324 which extend in the x-axis direction and the y-axis direction are provided over the substrate 6311. The first to fourth conductive materials 6321 to 6324 may be separated by a predetermined distance in the z-axis direction.

Fifth to eighth conductive materials 6325 to 6328 which extend in the x-axis direction and the y-axis direction may be provided over the substrate 6311. The fifth to eighth conductive materials 6325 to 6328 may be separated by the predetermined distance in the z-axis direction. The fifth to eighth conductive materials 6325 to 6328 may be separated from the first to fourth conductive materials 6321 to 6324 in the y-axis direction.

A plurality of lower pillars DP which pass through the first to fourth conductive materials 6321 to 6324 may be provided. Each lower pillar DP extends in the z-axis direction. Also, a plurality of upper pillars UP which pass through the fifth to eighth conductive materials 6325 to 6328 may be provided. Each upper pillar UP extends in the z-axis direction.

Each of the lower and upper pillars DP and UP may include an internal material 6361, an intermediate layer 6362, and a surface layer 6363. The intermediate layer 6362 may serve as a channel of the cell transistor. The surface layer 6363 may include a blocking dielectric layer, a charge storing layer and a tunneling dielectric layer.

The lower pillar DP and the upper pillar UP may be coupled electrically through a pipe gate PG. The pipe gate PG may be disposed in the substrate 6311. For instance, the pipe gate PG may include the same material as the lower pillar DP and the upper pillar UP.

A doping material 6312 of a second type extending in the x-axis direction and the y-axis direction may be provided over the lower pillars DP. For example, the doping material 6312 of the second type may include an n-type silicon material. The doping material 6312 of the second type may serve as a common source line CSL.

Drains 6340 may be provided over the upper pillars UP. The drains 6340 may include an n-type silicon material. First and second upper conductive materials 6351 and 6352 which extend in the y-axis direction may be provided over the drains 6340.

The first and second upper conductive materials 6351 and 6352 may be separated in the x-axis direction. The first and second upper conductive materials 6351 and 6352 may be formed of a metal. The first and second upper conductive materials 6351 and 6352 and the drains 6340 may be coupled electrically through contact plugs. The first and second upper conductive materials 6351 and 6352 respectively serve as first and second bit lines BL1 and BL2.

The first conductive material 6321 may serve as a source select line SSL, the second conductive material 6322 may serve as a first dummy word line DWL1, and the third and fourth conductive materials 6323 and 6324 serve as first and second main word lines MWL1 and MWL2, respectively. The fifth and sixth conductive materials 6325 and 6326 serve as third and fourth main word lines MWL3 and MWL4, respectively, the seventh conductive material 6327 may serve as a second dummy word line DWL2, and the eighth conductive material 6328 may serve as a drain select line DSL.

The lower pillar DP and the first to fourth conductive materials 6321 to 6324 adjacent to the lower pillar DP form a lower string. The upper pillar UP and the fifth to eighth conductive materials 6325 to 6328 adjacent to the upper pillar UP form an upper string. The lower string and the upper string may be coupled electrically through the pipe gate PG. One end of the lower string may be coupled electrically to the doping material 6312 of the second type which serves as the common source line CSL. One end of the upper string may be coupled electrically to a corresponding bit line through the drain 6340. One lower string and one upper string form one cell string which is coupled electrically between the doping material 6312 of the second type serving as the common source line CSL and a corresponding one of the upper conductive material layers 6351 and 6352 serving as the bit line BL.

That is, the lower string may include a source select transistor SST, the first dummy memory cell DMC1, and the first and second main memory cells MMC1 and MMC2. The upper string may include the third and fourth main memory cells MMC3 and MMC4, the second dummy memory cell DMC2, and a drain select transistor DST.

In FIGS. 9 and 10, the upper string and the lower string may form a NAND string NS, and the NAND string NS may include a plurality of transistor structures TS. Since the transistor structure included in the NAND string NS in FIGS. 9 and 10 is described above in detail with reference to FIG. 7, a detailed description thereof will be omitted herein.

Figure 11:
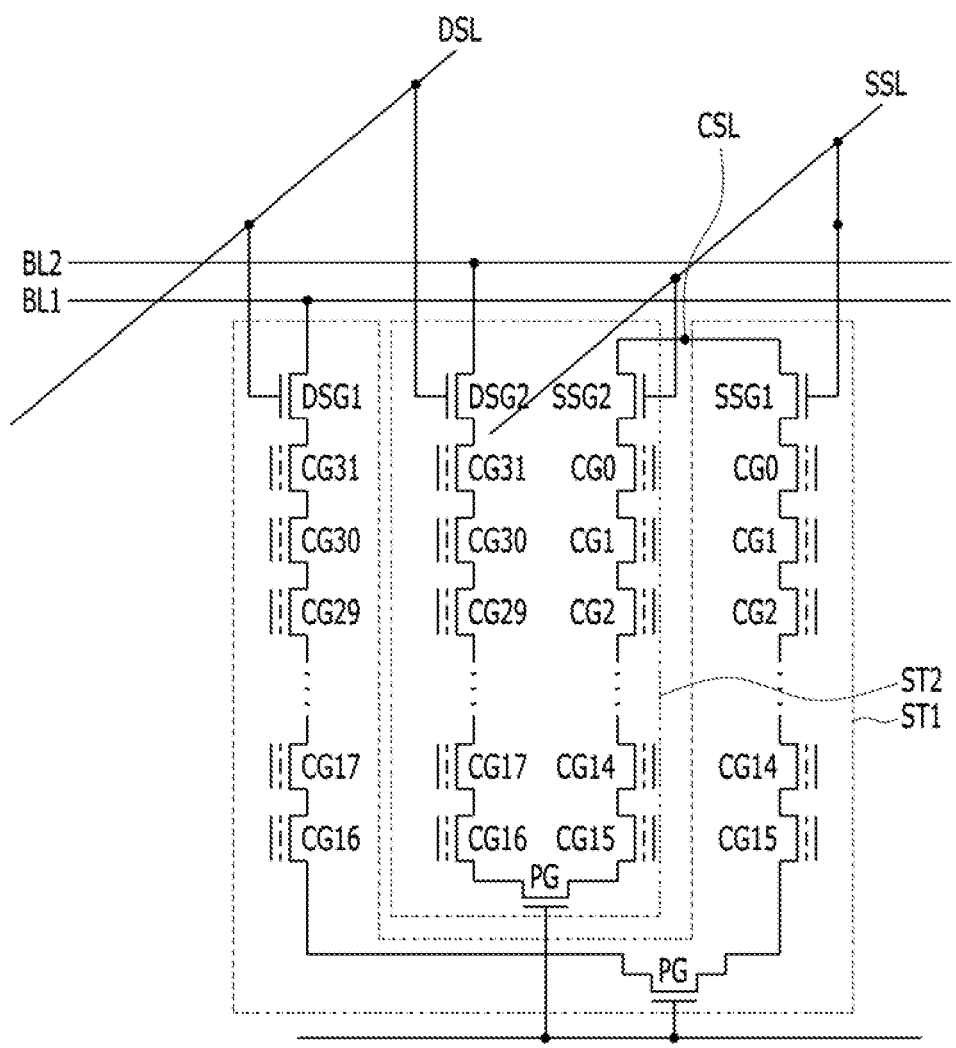

FIG. 11 is a circuit diagram illustrating the equivalent circuit of the memory block BLKj having the second structure as described above with reference to FIGS. 9 and 10. For the sake of convenience, only a first string and a second string, which form a pair in the memory block BLKj in the second structure are shown.

According to the embodiment of FIG. 11, in the memory block BLKj having the second structure among the plurality of blocks of the memory device 150, cell strings, each of which is implemented with one upper string and one lower string coupled electrically through the pipe gate PG as described above with reference to FIGS. 9 and 10, may be provided in such a way as to define a plurality of pairs.

Namely, in the certain memory block BLKj having the second structure, memory cells CG0 to CG31 stacked along a first channel CH1 (not shown), for example, at least one source select gate SSG1 and at least one drain select gate DSG1 may form a first string ST1, and memory cells CG0 to CG31 stacked along a second channel CH2 (not shown), for example, at least one source select gate SSG2 and at least one drain select gate DSG2 may form a second string ST2.

The first string ST1 and the second string ST2 may be coupled electrically to the same drain select line DSL and the same source select line SSL. The first string ST1 may be coupled electrically to a first bit line BL1, and the second string ST2 may be coupled electrically to a second bit line BL2.

While it is described in FIG. 11 that the first string ST1 and the second string ST2 are coupled electrically to the same drain select line DSL and the same source select line SSL, it may be envisaged that the first string ST1 and the second string ST2 may be coupled electrically to the same source select line SSL and the same bit line BL, the first string ST1 may be coupled electrically to a first drain select line DSL1 and the second string ST2 may be coupled electrically to a second drain select line DSL2. Further it may be envisaged that the first string ST1 and the second string ST2 may be coupled electrically to the same drain select line DSL and the same bit line BL, the first string ST1 may be coupled electrically to a first source select line SSL1 and the second string ST2 may be coupled electrically a second source select line SSL2.

Figure 12:
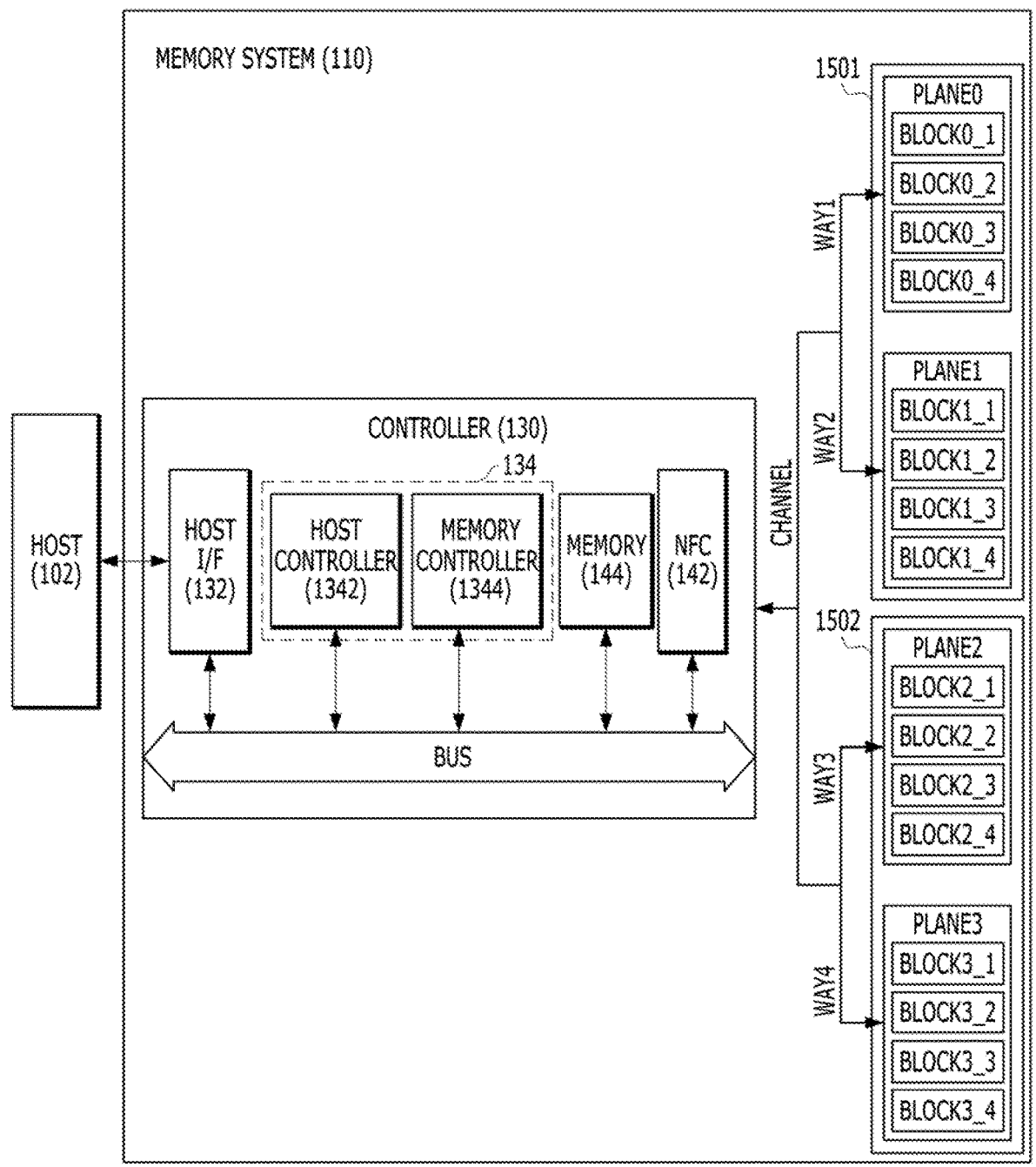
FIG. 12 is a block diagram showing the memory system of FIG. 1, according to an embodiment of the present invention.

FIG. 12 is a block diagram showing memory system 110 of FIG. 1, according to an embodiment of the present invention.

The memory system 110 includes the controller 130 and a plurality of memory devices, e.g., first and second memory devices 1501 and 1502. The controller 130 includes host interface 132, processor 134, memory 144, and memory interface 142. The first memory device 1501 may include a plurality of planes, for example, a 0-th plane PLANE0 and a first plane PLANE1. The second memory device 1502 may include a plurality of planes, for example, a second plane PLANE2 and a third plane PLANE3. Each of the 0-th to the third planes PLANE<0:3> may include a plurality of memory blocks, for example, memory blocks BLOCK0_<1:4>, BLOCK1_<1:4>, BLOCK2_<1:4>, and BLOCK3_<1:4>. We note that the number of memory devices, planes, and memory blocks may vary by design.

The first memory device 1501 is coupled to the memory interface 142 through a channel CHANNEL and thus is coupled to a bus BUS disposed within the controller 130. The 0-th plane PLANE0 of the first memory device 1501 is coupled to the memory interface 142 through the first way WAY1 and the channel CHANNEL. In this manner, the 0-th plane PLANE0 of the first memory device 1501 is coupled to the bus BUS disposed within the controller 130. Likewise, the first plane PLANE1 of the first memory device 1501 is coupled to the memory interface 142 through the second way WAY2 and the channel CHANNEL and thus is coupled to the bus within the controller 130.

The second memory device 1502 is coupled to the memory interface 142 through the channel CHANNEL and thus is coupled to the bus within the controller 130. The second plane PLANE2 of the second memory device 1502 is coupled to the memory interface 142 through the third way WAY1 and the channel CHANNEL and thus is coupled to the bus within the controller 130. Likewise, the third plane PLANE3 of the second memory device 1502 is coupled to the memory interface 142 through the channel CHANNEL the fourth way WAY4 and thus is coupled to the bus within the controller 130.

The first and second memory devices 1501 and 1502 may perform both of an interleaved read operation and a serial read operation on a per plane unit basis, which will be described later.

The host 102 is coupled to the bus through the host interface 132. Any suitable host interface may be used.

The processor 134 includes the host controller 1342 for controlling operations with the host 102 in the overall operation of the memory system 110 and the memory controller 1344 for controlling operations with the first and second memory devices 1501 and 1502 in the overall operation of the memory system 110.

For example, the host controller 1342 controls the input/output operations of commands, data, and addresses between the host controller 1342 and the host 102.

The memory controller 1344 controls, for example, the input/output operations of commands, data, and addresses between the memory controller 1344 and the first and second memory devices 1501 and 1502.

Figure 13:
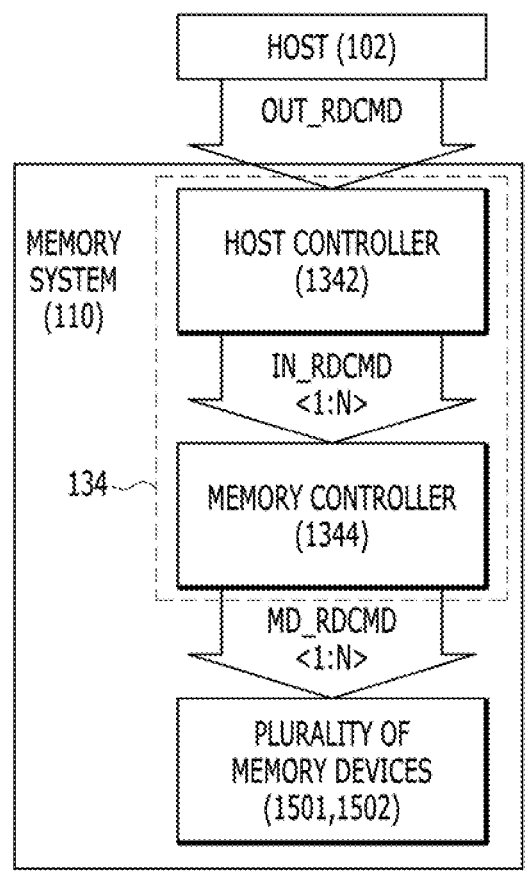
FIG. 13 is a diagram illustrating an operation of a processor shown in FIG. 12, according to an embodiment of the present invention.

FIG. 13 is a diagram illustrating an operation of the processor 134.

The external read command OUT_RDCMD generated by the host 102 and applied to the memory system 110 is inputted to the host controller 1342 within the processor 134.

The host controller 1342 generates a plurality of internal read commands IN_RDCMD<1:N> based on the size of the read-requested data of the external read command OUT_RDCMD and a "minimum read size" for each memory device. In response to each of the plurality of internal read commands IN_RDCMD<1:N>, each of the first and second memory devices 1501 and 1502 reads data therefrom in "minimum read size" data units. For example, when the read-requested data have a size "K," the read-requested data can be divided into "N" number data units wherein each data unit has the minimum read size. Hence, the host controller 1342 generates "N" internal read commands IN_RDCMD<1:N> for the first and second memory devices 1501 and 1502.

The "minimum read size" is a minimum size of data that can be read from each of the first and second memory devices 1501 and 1502 through a single read operation.

The read operation of each of the first and second memory devices 1501 and 1502 is performed on a plane basis. This means that the first and second memory devices 1501 and 1502 may perform the read operation in parallel on a plane level, i.e., the read operation may be performed in parallel for all of the 0-th to the third planes PLANE<0:3> while performing the read operation in series on a block level in each of the 0-th to the third planes PLANE<0:3>, i.e., the read operation in series to the plurality of blocks BLOCK0_<1:4> in the 0-th plane PLANE0, the plurality of blocks BLOCK1_<1:4> in the first plane PLANE1, the plurality of blocks BLOCK2_<1:4> in the second plane PLANE2, or the plurality of blocks BLOCK3_<1:4> in the third plane PLANE3.

For example, the read operation may be performed to any block in the first to the third plane PLANE<1:3> in parallel during the read operation to the second block BLOCK0_2 of the 0-th plane PLANE0. Hence, while a read operation is performed to the second block of the o-th plane, multiple read operations may also be performed in parallel, i.e., simultaneously to the second block of the first, second and third planes.

Or stated more simply, multiple read operations may be performed in parallel to one block at a time for each of the planes. Meaning for example, that multiple read operations may be performed for block 1 of the 0 th plane PLANE0, block 2 of the first plane PLANE1, block 2 of the second plane PLANE2, and block 3 of the third plane PLANE3.

However, the read operation may be performed in series to the plurality of blocks BLOCK0_<1:4> in the 0-th plane PLANE0. For example, a read operation in the second block of the first plane may not start until a read operation that started earlier in any of the remaining blocks of the first plane, for example, block 3 has been completed.

Despite of the parallel read operation on a plane level, the read data as a result of the parallel read operation is transmitted to the controller 130 in series through the first to fourth ways WAY1 to WAY4 coupling the channel and the 0-th to third planes PLANE0 to PLANE3.

Accordingly, the "minimum read size" which may be read from the first and second memory devices 1501 and 1502 through a single read operation means a minimum size of data which may be read in the block level (i.e., each of the plurality of blocks BLOCK0_<1:4> in the 0-th plane PLANE0, each of the plurality of blocks BLOCK1_<1:4> in the first plane PLANE1, each of the plurality of blocks BLOCK2_<1:4> in the second plane PLANE2, or each of the plurality of blocks BLOCK3_<1:4> in the third plane PLANE3).

For example, the minimum read size for a single read operation may be a unit of a page or a half page.

For example, when the "minimum read size" is 4 KB and the read-requested data of the external read command OUT_RDCMD has a size of 32 KB, a total of 8 internal read commands IN_RDCMD<1:8> may be generated.

Among the plurality of internal read commands IN_RDCMD<1:N>, the memory controller 1344 generates a following memory read command MD_RDCMD<i+1> ($1 \le i \le N-1$) based on a following internal read command IN_RDCMD<i+1> during the interleaved read operation to the first and second memory devices 1501 and 1502 according to a current memory read command MD_RDCMD<i> corresponding to a current internal read command IN_RDCMD<i>.

For example, in a "continuous check mode", the memory controller 1344 generates the first memory read command MD_RDCMD<1> based on the first internal read command IN_RDCMD<1>, and performs the read operation to the first and second memory devices 1501 and 1502 according to the first memory read command MD_RDCMD<1>. While performing the read operation to the first and second memory devices 1501 and 1502 according to the first memory read command MD_RDCMD<1>, the memory controller 1344 generates the second memory read command MD_RDCMD<2> based on the second internal read command IN_RDCMD<2>.

Figure 14:
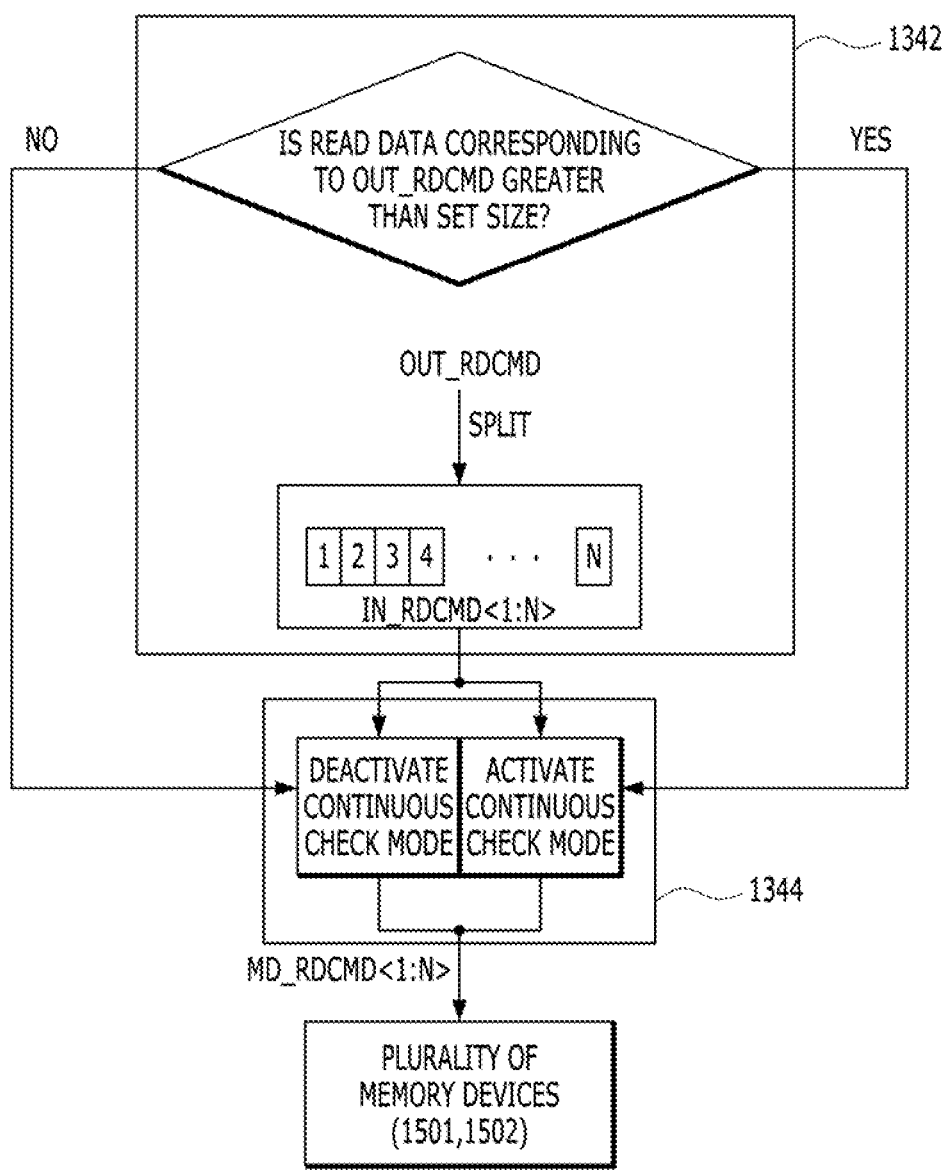
FIG. 14 is a diagram illustrating an operation of a host controller shown in FIG. 12, according to an embodiment of the present invention.

FIG. 14 is a diagram illustrating an operation of the host controller 1342 shown in FIG. 12, according to an embodiment of the present invention.

The host controller 1342 generates the plurality of internal read commands IN_RDCMD<1:N> based on the size of read-requested data of the external read command OUT_RDCMD and the "minimum read size" of each of the memory devices.

When generating the plurality of internal read commands IN_RDCMD<1:N>, the host controller 1342 may activate the continuous check mode when the size of the read-requested data is greater than the minimum read size, and may deactivate the continuous check mode when the size of the read-requested data is smaller than the minimum read size. The criteria for activation of the continuous check mode may vary according to the designer's choice. For example, the host controller 1342 may activate the continuous check mode when the size of the read-requested data is two times greater or more than the minimum read size.

In the activated continuous check mode, the memory controller 1344 generates the following memory read command MD_RDCMD<i+1> ($1 \le i \le N-1$) based on the following internal read command IN_RDCMD<i+1> during the interleaved read operation to the first and second memory devices 1501 and 1502 according to the current memory read command MD_RDCMD<i> corresponding to the current internal read command IN_RDCMD<i> among the plurality of internal read commands IN_RDCMD<1:N>, as described above.

In the deactivated continuous check mode, the memory controller 1344 sequentially generates all the memory read commands MD_RDCMD<1:N> based on all the internal read commands IN_RDCMD<1:N>, and then performs the serial read operation to the first and second memory devices 1501 and 1502 according to the sequentially generated memory read commands MD_RDCMD<1:N> corresponding to all the internal read commands IN_RDCMD<1:N>.

FIG. 15 is a diagram illustrating an operation of the memory controller 1344 shown in FIG. 12.

As described above with reference to FIG. 14, the host controller 1342 may activate the continuous check mode when the size of the read-requested data is greater than a predetermined size (e.g., the minimum read size), and may deactivate the continuous check mode when the size of the read-requested data is smaller than the predetermined size at step S10.

In the deactivated continuous check mode, at step S20, the memory controller 1344 sequentially generates all the memory read commands MD_RDCMD<1:N> based on all the internal read command IN_RDCMD<1:N> without performing the read operation. Then, at step S30, the memory controller 1344 performs the serial read operation to the first and second memory devices 1501 and 1502 according to the sequentially generated memory read commands MD_RDCMD<1:N> corresponding to all the internal read command IN_RDCMD<1:N>.

In the activated continuous check mode, steps S40 to S70 may be repeatedly performed for the internal read command IN_RDCMD<1:N> with an index "i" ($0 \le i \le N-1$) increasing by 1 at each repetition.

At step S40, the memory controller 1344 generates the following memory read command MD_RDCMD<i+1> ($1 \le i \le N-1$) based on the following internal read command IN_RDCMD<i+1> during the interleaved read operation to the first and second memory devices 1501 and 1502 according to the current memory read command MD_RDCMD<i> corresponding to the current internal read command IN_RDCMD<i> among the plurality of internal read commands IN_RDCMD<1:N>, as described above.

At step S50, the memory controller 1344 checks whether the read operation to the first and second memory devices 1501 and 1502 according to the following memory read command MD_RDCMD<i+1> is an interleaved read operation.

When the read operation to the first and second memory devices 1501 and 1502 according to the following memory read command MD_RDCMD<i+1> is an interleaved read operation as a result of step S50, the memory controller 1344 performs S40 again while increasing index "i".

When the read operation to the first and second memory devices 1501 and 1502 according to the following memory read command MD_RDCMD<i+1> is not the interleaved read operation as the result of step S50, the memory controller 1344 increases a count value, which is initially set to zero, at step S60.

At step S70, the memory controller 1344 checks whether the count value is smaller than a set value (e.g., the set value of 2).

When the count value is smaller than the set value as a result of step S70, the memory controller 1344 repeats steps S40 to S70 with increased index "i".

When the count value is equal to or greater than the set value as the result of step S70, the memory controller 1344 deactivate the currently activated continuous check mode at step 80.

After step S80, the memory controller 1344 performs steps S20 and S30 for the remaining internal read commands among the plurality of internal read command IN_RD-CMD<1:N>.

According to the operation of the memory controller 1344 as described above, the operation of the memory controller 1344 is divided as follows.

A first operation of the memory controller 1344 is performed according to all of the internal read commands IN_RDCMD<1:N> in the deactivated continuous check mode.

In this case, the memory controller 1344 performs steps of S20 and S30, as described above.

A second operation of the memory controller 1344 is performed according to the internal read commands IN_RD-CMD<1:N> in the activated continuous check mode.

In this case, the memory controller 1344 repeats steps of S40 and S50 with the index "i" increasing at each repetition, as described above.

For example, assuming that the read operations to the first and second memory devices 1501 and 1502 according to both of the first and second memory read commands MD_RDCMD<1> and MD_RDCMD<2> are the interleaved read operations, the memory controller 1344 generates the second memory read command MD_RDCMD<2> based on the second internal read command IN_RD-CMD<2> during the interleaved read operation to the first and second memory devices 1501 and 1502 according to the first memory read command MD_RDCMD<1> corresponding to the first internal read command IN_RDCMD<1> among the plurality of internal read commands IN_RD-CMD<1:N>. Then, the memory controller 1344 generates the third memory read command MD_RDCMD<3> based on the third internal read command IN_RDCMD<3> during the interleaved read operation to the first and second memory devices 1501 and 1502 according to the second memory read command MD_RDCMD<2> corresponding to the second internal read command IN_RDCMD<2> among the plurality of internal read commands IN_RDCMD<1:N>.

In summary, in the activated continuous check mode, the interleaved read operations to the first and second memory devices 1501 and 1502 are performed according to both of the current memory read commands MD_RDCMD<i> and the following memory read commands MD_RDCMD<i+1>, and the memory controller 1344 sequentially reads data of the "minimum read size" from the first and second memory devices 1501 and 1502.

A third operation of the memory controller 1344 is performed according to part of the internal read commands IN_RDCMD<1:N> in the activated continuous check mode and the remaining part of the internal read commands IN_RDCMD<1:N> in the deactivated continuous check mode.

In this case, the memory controller 1344 repeats steps S40 to S70 with the index "i" increasing at each repetition in the activated continuous check mode, as described above; then deactivates the currently activated continuous check mode at step S80; and then steps S20 and S30 in the deactivated continuous check mode, as described above.

As described above, at step S50, the memory controller 1344 checks whether the read operation to the first and second memory devices 1501 and 1502 according to the following memory read command MD_RDCMD<i+1> is the interleaved read operation.

When the read operation to the first and second memory devices 1501 and 1502 according to the following memory read command MD_RDCMD<i+1> is the interleaved read operation as a result of step S50, the memory controller 1344 performs S40 again with increased index "i".

For example, assuming that the read operations to the first and second memory devices 1501 and 1502 according to both of the first and second memory read commands MD_RDCMD<1> and MD_RDCMD<2> are the interleaved read operations, the memory controller 1344 generates the second memory read command MD_RDCMD<2> based on the second internal read command IN_RD-CMD<2> during the interleaved read operation to the first and second memory devices 1501 and 1502 according to the first memory read command MD_RDCMD<1> corresponding to the first internal read command IN_RDCMD<1> among the plurality of internal read commands IN_RD-CMD<1:N>. Then, the memory controller 1344 generates the third memory read command MD_RDCMD<3> based on the third internal read command IN_RDCMD<3> during the interleaved read operation to the first and second memory devices 1501 and 1502 according to the second memory read command MD_RDCMD<2> corresponding to the second internal read command IN_RDCMD<2> among the plurality of internal read commands IN_RDCMD<1:N>.

When the read operation to the first and second memory devices 1501 and 1502 according to the following memory read command MD_RDCMD<i+1> is not the interleaved read operation as determined in step S50, the memory controller 1344 increases the count value at step S60.

For example, it is assumed that the read operations to the first and second memory devices 1501 and 1502 according to the remaining memory read commands MD_RDCMD<3: N> other than the first and second memory read commands MD_RDCMD<1> and MD_RDCMD<2> are not interleaved read operations.

When the read operation to the first and second memory devices 1501 and 1502 according to the third memory read command MD_RDCMD<3> (i.e., i=2) is not the interleaved read operation as the result of step S50, the memory controller 1344 increases the count value to "1" at step S60. At step S70, the memory controller 1344 checks whether the count value is smaller than the set value of 2. Since, the count value of 1 is smaller than the set value of 2, the memory controller 1344 repeats steps S40 to S70 and increases index to 3.

During the repeated steps S40 to S70 with increased index of 3, the memory controller 1344 generates the fourth memory read command MD_RDCMD<4> based on the fourth internal read command IN_RDCMD<4> during the read operation to the first and second memory devices 1501 and 1502 according to the third memory read command MD_RDCMD<3> corresponding to the third internal read command IN_RDCMD<3>. When the read operation to the first and second memory devices 1501 and 1502 according to the fourth memory read command MD_RDCMD<4> (i.e., i=3) is not the interleaved read operation as the result of step S50, the memory controller 1344 increases the count value to 2 at step S60. Then, since the count value of 2 is equal to the set value of 2, the memory controller 1344 deactivates the currently activated continuous check mode at step 80. After step S80, the memory controller 1344 performs steps S20 and S30 for the remaining fifth to N-th internal read commands IN_RDCMD<4:N> in the deactivated continuous check mode.

Accordingly, through the steps S20 and S30, the fifth to N-th memory read commands MD_RDCMD<5:N> are generated the fifth to N-th internal read commands IN_RDCMD<5:N>. Accordingly, currently fourth to N-th memory read commands MD_RDCMD<5:N> are generated in total in the deactivated continuous check mode, and then the memory controller 1344 performs the serial read operation to the first and second memory devices 1501 and 1502 according to the sequentially generated fourth to N-th memory read commands MD_RDCMD<4:N>.

In summary, when the read operations according to part of the memory read commands MD_RDCMD<1:N> are interleaved read operations while the read operations according to the remaining part of the memory read commands MD_RDCMD<1:N> are not interleaved read operations, the interleaved read operations are performed according to the part of the memory read commands MD_RDCMD<1:N> in the activated continuous check mode and the serial read operations are performed according to the remaining part of the memory read commands MD_RDCMD<1:N> in the deactivated continuous check mode. The above described first operation of the memory controller 1344 is performed for the interleaved read operations performed according to the part of the memory read commands MD_RDCMD<1:N> while the above described second operation of the memory controller 1344 is performed for the serial read operations performed according to the remaining part of the memory read commands MD_RDCMD<1:N>.

An example of the serial read operation in the deactivated continuous check mode is as follows.

According to the embodiment of FIG. 12, it may be assumed that the read operation according to the current memory read commands MD_RDCMD<i> corresponding to the current internal read commands IN_RDCMD<i> is performed in the first block BLOCK1_1 of the plurality of blocks BLOCK1_<1:4> included in the first plane PLANE1 of the first memory device 1501. Furthermore, it may be assumed that the read operation according to the following memory read commands MD_RDCMD<i+1> corresponding to the following internal read commands IN_RDCMD<i+1> is performed in the third block BLOCK1_3 of the plurality of blocks BLOCK1_<1:4> included in the first plane PLANE1 of the first memory device 1501. In this case when the read operation according to the current memory read commands MD_RDCMD<i> and the read operation according to the following memory read commands MD_RDCMD<i+1> are performed in the same first plane PLANE1, the two read operations are not the interleaved read operations but the serial read operations.

An example of the interleaved read operation in the activated continuous check mode is as follows.

According to the embodiment of FIG. 12, it may be assumed that the read operation according to the current memory read commands MD_RDCMD<i> corresponding to the current internal read commands IN_RDCMD<i> is performed in the first block BLOCK1_1 of the plurality of blocks BLOCK1_<1:4> included in the first plane PLANE1 of the first memory device 1501. Furthermore, it may be assumed that the read operation according to the following memory read commands MD_RDCMD<i+1> corresponding to the following internal read commands IN_RDCMD<i+1> is performed in the first block BLOCK0_1 of the plurality of blocks BLOCK0_<1:4> included in the 0-th plane PLANE0 of the first memory device 1501. In this case when the read operation according to the current memory read commands MD_RDCMD<i> and the read operation according to the following memory read commands MD_RDCMD<i+1> are performed in the different first and 0-th planes PLANE1 and PLANE0, the read operation according to the current memory read commands MD_RDCMD<i> and the read operation according to the following memory read commands MD_RDCMD<i+1> are the interleaved read operations.

In this technology, when an external read command applied from the host requests read data having a size greater than a preset size (e.g., the minimum read size), a plurality of internal read commands is generated on the basis of the size of the read-requested data of the external read command and a preset size. A read operation according to a current memory read command corresponding to a current internal read command and an operation for generating a following memory read command based on a following internal read command overlap. At this time, the read operation according to the following memory read command and the read operation according to the current memory read command are the interleaved read operations.

Accordingly, there is an advantage in that the time taken to process an external read command that requests read data having a size greater than a preset size can be minimized.

Although various embodiments have been described for illustrative purposes, it will be apparent to those skilled in the art that various changes and modifications may be made without departing from the spirit and scope of the invention as defined in the following claims.

What is claimed is:

1. A memory system, comprising:
   a plurality of memory devices;
   a host controller suitable for generating a plurality of internal read commands based on an external read command, a size of read-requested data corresponding to the external read command and a minimum read size allowed in each of the plurality of memory devices; and
   a memory controller suitable for:
      sequentially generating a plurality of memory read commands, each corresponding to each internal read command,
      checking whether operations in response to current and following internal read commands are carried out in an interleaved way, and
      performing an interleaved read operation to the memory devices according to the sequentially generated memory read commands,
   wherein, when a continuous check mode is activated, the memory controller generates and checks a following memory read command while a read operation according to a current memory read command is performed.

2. The memory system of claim 1, wherein the number of the internal read commands depends on both the size of read-requested data and the minimum read size.

3. The memory system of claim 1, wherein the host controller is further suitable for:
   activating the continuous check mode when the size of read-requested data is greater than a predetermined multiple of the minimum read size, and
   deactivating the continuous check mode when the size of read-requested data is smaller than the predetermined multiple of the minimum read size.

4. The memory system of claim 1, wherein the memory controller is further suitable for, when the continuous check mode is deactivated, performing a serial read operation to the memory devices after sequentially generating all of the plurality of memory read commands.

5. The memory system of claim 3, wherein the memory controller is further suitable for deactivating the continuous check mode when read operations to the memory devices according to a predetermined number of the memory read commands are not the interleaved read operations.

6. The memory system of claim 5,
wherein each of the memory devices comprises a plurality of planes, and the minimum read size is a unit size of data read from each of the planes through a single read operation.

7. The memory system of claim 6, wherein the memory controller deactivates the continuous check mode when the read operations according to the predetermined number of the memory read commands are to be performed to the same plane among the planes.

8. An operating method of a memory system comprising a plurality of memory devices, the operating method comprising:
generating a plurality of internal read commands based on an external read command, a size of read-requested data corresponding to the external read command and a minimum read size allowed in each of the plurality of memory devices;
sequentially generating a plurality of memory read commands, each corresponding to each internal read command;
checking whether operations in response to current and following internal read commands are carried out in an interleaved way; and
performing an interleaved read operation to the memory devices according to the sequentially generated memory read commands,
wherein, when a continuous check mode is activated, the memory controller generates and checks a following memory read command while a read operation according to a current memory read command is performed.

9. The operating method of claim 8, wherein the number of the internal read commands depends on both the size of read-requested data and the minimum read size.

10. The operating method of claim 8, further comprising first mode setting for:
activating the continuous check mode when the size of read-requested data is greater than a predetermined multiple of the minimum read size, and
deactivating the continuous check mode when the size of read-requested data is smaller than the predetermined multiples of the minimum read size.

11. The operating method of claim 8, further comprising performing, when the continuous check mode is deactivated, a serial read operation to the memory devices after sequentially generating all of the plurality of memory read commands.

12. The operating method of claim 10, further comprising deactivating the continuous check mode when read operations to the memory devices according to a predetermined number of the memory read commands are not the interleaved read operations.

13. The operating method of claim 12,
wherein each of the memory devices comprises a plurality of planes, and
wherein the minimum read size is a unit size of data read from each of the planes through a single read operation.

14. The operating method of claim 13, the deactivating of the continuous check mode is performed when the read operations according to the predetermined number of the memory read commands are to be performed to the same plane among the planes.

15. A memory system, comprising:
a plurality of memory devices;
a host controller suitable for generating a plurality of internal read commands based on an external read command, a size of read-requested data corresponding to the external read command and a minimum read size allowed in each of the plurality of memory devices; and
a memory controller suitable for:
performing a read operation according to a first memory read command corresponding to a first internal read command among the plurality of internal read commands;
when a continuous check mode is activated, generating and checking a second memory read command corresponding to a second internal read command among the plurality of internal read commands to determine a read operation according to the second memory read command to be performed in an interleaved way with the first memory read command, while the read operation according to the first memory read command is performed; and
performing a read operation according to the second memory read command.

* * * * *